(12) United States Patent
Beck et al.

(10) Patent No.: US 10,428,909 B2
(45) Date of Patent: Oct. 1, 2019

(54) AUTOMATIC PLANETARY TRANSMISSION

(71) Applicant: ZF Friedrichshafen AG, Friedrichshafen (DE)

(72) Inventors: Stefan Beck, Eriskirch (DE); Armin Gierling, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/699,217

(22) Filed: Sep. 8, 2017

(65) Prior Publication Data

US 2018/0073612 A1 Mar. 15, 2018

(30) Foreign Application Priority Data

Sep. 12, 2016 (DE) ........................ 10 2016 217 329

(51) Int. Cl.
*F16H 3/66* (2006.01)
*B60K 6/365* (2007.10)
*B60K 6/48* (2007.10)

(52) U.S. Cl.
CPC ............ *F16H 3/663* (2013.01); *B60K 6/365* (2013.01); *F16H 3/66* (2013.01);
(Continued)

(58) Field of Classification Search
CPC ..... F16H 2200/2012; F16H 2200/2015; F16H 2200/2017; F16H 2200/2046;
(Continued)

(56) References Cited

U.S. PATENT DOCUMENTS 7,458,912 B2 * 12/2008 Oguri ........................ F16H 3/66
 475/275
7,614,975 B2 * 11/2009 Seo ........................... F16H 3/66
 475/278
(Continued)

FOREIGN PATENT DOCUMENTS

DE 202015004910 U1 8/2015
WO WO 2015029481 A1 3/2015

OTHER PUBLICATIONS

German Search Report DE102016217329.4, dated Apr. 4, 2017. (10 pages).

*Primary Examiner* — Jacob S. Scott
*Assistant Examiner* — James J Taylor, II
(74) *Attorney, Agent, or Firm* — Dority & Manning, P.A.

(57) ABSTRACT

An automatic transmission with housing, input shaft, output shaft, four planetary gear sets, and six shift elements. Second element of second planetary gear set forms first shaft; second element of third planetary gear set forms second shaft; first elements of first and second planetary gear sets form third shaft; third element of third planetary gear set forms fourth shaft; second element of first planetary gear set and third element of second planetary gear set form fifth shaft; third element of first planetary gear set forms sixth shaft; first elements of third and fourth planetary gear sets form seventh shaft; and third element of fourth planetary gear set forms eighth shaft. First shift element is between third shaft and housing; second shift element is between fourth shaft and housing; third shift element is between second and eighth shafts; fourth shift element is between fourth and fifth shafts; fifth shift element is between fifth and seventh shafts; sixth shift element is between sixth and seventh shafts.

26 Claims, 19 Drawing Sheets

(52) U.S. Cl.
CPC ............... *B60K 2006/4808* (2013.01); *B60K 2006/4816* (2013.01); *B60K 2006/4825* (2013.01); *F16H 2200/0069* (2013.01); *F16H 2200/0073* (2013.01); *F16H 2200/0078* (2013.01); *F16H 2200/0086* (2013.01); *F16H 2200/2012* (2013.01); *F16H 2200/2046* (2013.01); *F16H 2200/2048* (2013.01)

(58) Field of Classification Search
CPC ..... F16H 2200/2048; F16H 2200/2051; F16H 2200/2053; F16H 2200/2056; F16H 2200/2058; F16H 2200/2061; F16H 2200/0069; F16H 2200/0073; F16H 2200/0078

See application file for complete search history.

(56) References Cited

U.S. PATENT DOCUMENTS

| | | | |
|---|---|---|---|
| 8,137,232 B2* | 3/2012 | Wittkopp | F16H 3/66 475/280 |
| 8,202,190 B2* | 6/2012 | Phillips | F16H 3/66 475/275 |
| 8,795,128 B2* | 8/2014 | Mellet | F16H 3/66 475/275 |
| 10,024,398 B2* | 7/2018 | Kook | F16H 3/66 |
| 10,281,012 B2* | 5/2019 | Kook | F16H 3/66 |
| 10,352,405 B2* | 7/2019 | Kook | F16H 3/66 |
| 2013/0196809 A1* | 8/2013 | Ziemer | B60K 6/365 475/5 |
| 2016/0160964 A1 | 6/2016 | Sugiura et al. | |

\* cited by examiner

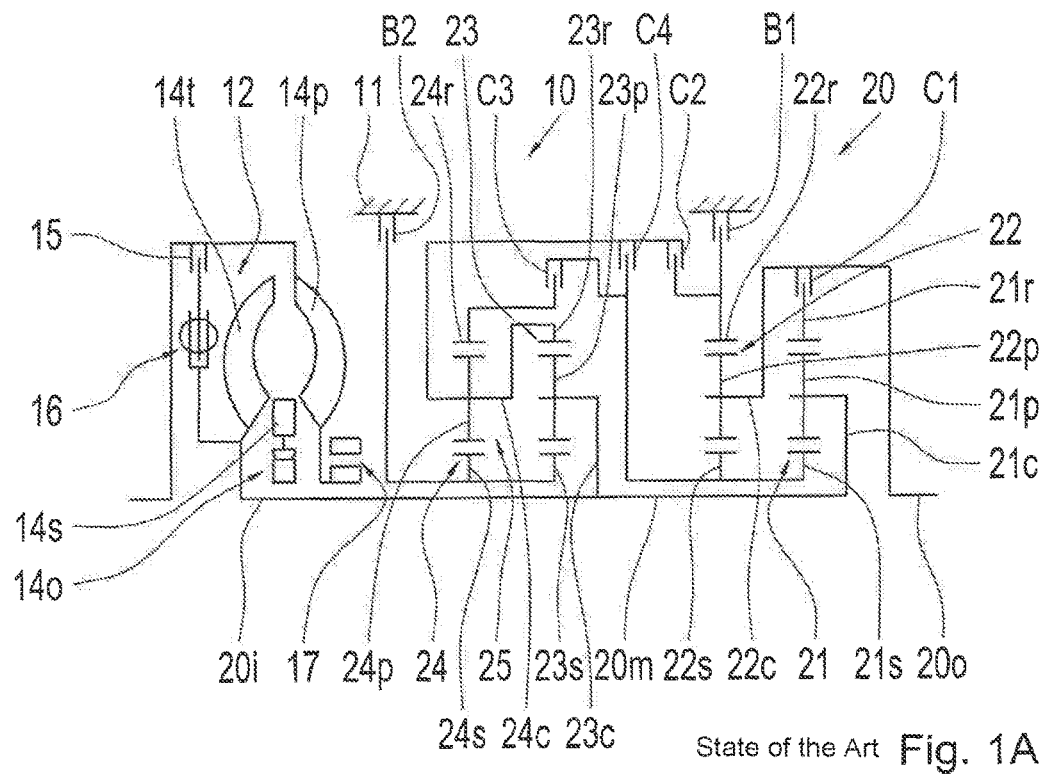
State of the Art Fig. 1A
|  | C1 | C2 | C3 | C4 | B1 | B2 |
|---|---|---|---|---|---|---|
| 1st | o | o |  |  |  | o |
| 2nd | o |  |  |  | o | o |
| 3rd |  | o |  |  | o | o |
| 4th |  |  |  | o | o | o |
| 5th |  | o |  | o | o |  |
| 6th | o |  |  | o | o |  |
| 7th | o |  | o | o |  |  |
| 8th |  |  | o | o | o |  |
| 9th | o |  | o |  | o |  |
| 10th |  | o | o |  | o |  |
| REV. |  | o | o |  |  | o |
State of the Art Fig. 1B

| gear | engaged shifting elements | | | | | | |
|---|---|---|---|---|---|---|---|
| | brakes | | clutches | | | | |
| | 03 | 04 | 28 | 45 | 57 | 67 | 46 |
| 1 |   | X |   |   | X |   | X |
| 2 |   | X |   |   | X | X |   |
| 3 | X | X |   |   | X |   |   |
| 4 | X | X |   |   |   | X |   |
| 5 | X | X | X |   |   |   |   |
| 6 | X |   | X |   |   | X |   |
| 7 | X |   | X |   | X |   |   |
| 8 |   |   | X | X | X |   |   |
| 9 | X |   | X | X |   |   |   |
| 10 | X |   |   | X | X |   |   |
| 11 | X |   |   | X |   | X |   |
| 12 | X |   |   |   | X |   | X |
| 13 | X |   |   |   |   | X | X |
| R |   | X |   | X |   | X |   |

Fig. 2B

| gear | engaged shifting elements | | | | | | |
|---|---|---|---|---|---|---|---|
| | brakes | | clutches | | | | |
| | 03 | 04 | 28 | 45 | 57 | 67 | 47 |
| 1 |  | X |  |  | X | X |  |
| 2 | X | X |  |  | X |  |  |
| 3 | X | X |  |  |  | X |  |
| 4 | X | X | X |  |  |  |  |
| 5 | X |  | X |  |  | X |  |
| 6 | X |  | X |  | X |  |  |
| 7 |  |  | X | X | X |  |  |
| 8 | X |  | X | X |  |  |  |
| 9 | X |  |  | X | X |  |  |
| 10 | X |  |  | X |  | X |  |
| 11 | X |  |  |  |  | X | X |
| R |  | X |  | X |  | X |  |

Fig. 3B

| gear | engaged shifting elements | | | | | | |
|---|---|---|---|---|---|---|---|
| | brakes | | clutches | | | | |
| | 03 | 04 | 28 | 45 | 57 | 67 | 24 |
| 1 |  | X |  |  | X | X |  |
| 2 | X | X |  |  | X |  |  |
| 3 | X | X |  |  |  | X |  |
| 4 | X | X | X |  |  |  |  |
| 5 | X |  | X |  |  | X |  |
| 6 | X |  | X |  | X |  |  |
| 7 |  |  | X | X | X |  |  |
| 8 | X |  | X | X |  |  |  |
| 9 | X |  |  | X | X |  |  |
| 10 | X |  |  | X |  | X |  |
| 11 | X |  |  |  |  | X | X |
| R |  | X |  | X |  | X |  |

Fig. 4B

| gear | engaged shifting elements | | | | | | |
|---|---|---|---|---|---|---|---|
| | brakes | | clutches | | | | |
| | 03 | 04 | 28 | 45 | 57 | 67 | 27 |
| 1 | | X | | | X | X | |
| 2 | X | X | | | X | | |
| 3 | X | X | | | | X | |
| 4 | X | X | X | | | | |
| 5 | X | | X | | | X | |
| 6 | X | | X | | X | | |
| 7 | | | X | X | X | | |
| 8 | X | | X | X | | | |
| 9 | X | | | X | X | | |
| 10 | X | | | X | | X | |
| 11 | X | | | | | X | X |
| R | | X | | X | | X | |

Fig. 5B

| gear | engaged shifting elements | | | | | | |
|---|---|---|---|---|---|---|---|
| | brakes | | clutches | | | | |
| | 03 | 04 | 28 | 45 | 57 | 67 | 26 |
| 1 |  | X |  |  | X |  | X |
| 2 |  | X |  |  | X | X |  |
| 3 | X | X |  |  | X |  |  |
| 4 | X | X |  |  |  | X |  |
| 5 | X | X | X |  |  |  |  |
| 6 | X |  | X |  |  | X |  |
| 7 | X |  | X |  | X |  |  |
| 8 |  |  | X | X | X |  |  |
| 9 | X |  | X | X |  |  |  |
| 10 | X |  |  | X | X |  |  |
| 11 | X |  |  | X |  | X |  |
| 12 | X |  |  |  |  | X | X |
| R |  | X |  | X |  | X |  |

Fig. 6B

| gear | engaged shifting elements | | | | | | |
|---|---|---|---|---|---|---|---|
| | brakes | | clutches | | | | |
| | 03 | 04 | 28 | 45 | 57 | 67 | 25 |
| 1 | | X | | | X | X | |
| 2 | X | X | | | X | | |
| 3 | X | X | | | | X | |
| 4 | X | X | X | | | | |
| 5 | X | | X | | | X | |
| 6 | X | | X | | X | | |
| 7 | | | X | X | X | | |
| 8 | X | | X | X | | | |
| 9 | X | | | X | X | | |
| 10 | X | | | X | | X | |
| R1 | | X | | X | | X | |
| R2 | | X | | | | X | X |

Fig. 7B

AUTOMATIC PLANETARY TRANSMISSION

FIELD OF THE INVENTION

The present invention generally relates to an automatic transmission in planetary design.

BACKGROUND

Automatically shiftable vehicle transmissions in planetary design have been described multiple times in the state of the art and are undergoing continuous further development and improvement. The objective is for these transmissions to exhibit an adequate number of gears and a gear ratio suitable for motor vehicles, with a high overall transmission ratio spread, favorable gear steps and a launching torque ratio that is sufficiently high for the specific application. At the same time, the construction expenditure of these transmissions should be as low as possible; particularly, only a small number of shift elements should be required. In addition, in sequential shifting mode, grouped shifting is generally avoided; i.e. when shifting into the next higher or the next lower gear, only one previously engaged shift element is disengaged and one previously disengaged shift element is engaged.

A generic automatic transmission with a transmission housing, an input shaft, an output shaft, four planetary gear sets, two hydraulically actuatable brakes and four hydraulically actuatable clutches, in which three of these six shift elements are engaged in every gear to create one reverse gear and ten shiftable forward gears without grouped shifting, is known from US 2016/0160964 A1. The first two of the four planetary gear sets form an upstream gear set, which is a reduced two connections-four shafts transmission in the design of a Simpson planetary gear set and is permanently connected to the input shaft. The other two of the four planetary gear sets form a main gear set, which is a two connections-five shafts transmission in a design similar to a Simpson planetary gear set and is permanently connected to the input shaft and to the output shaft. Following the nomenclature used in US 2016/0160964 A1, the first brake and the first clutch are permanently connected only to the main gear set, while the second and the third clutch and the fourth clutch are permanently connected to both the main gear set and the upstream gear set, such that the second, third and fourth clutch are disposed in the power flow between the upstream gear set and main gear set. The second brake is permanently connected only to the upstream gear set. This allows three different output speeds of the upstream gear set, of which one is lower than the input shaft speed, one is equal to the input shaft speed and one is higher than the input shaft speed, to selectively be transmitted to the main gear set. FIG. 1A shows the transmission diagram of this generic automatic transmission; FIG. 1B shows the associated shift logic.

Following the nomenclature of US 2016/0160964 A1, the main gear set includes two individual negative or minus planetary gear sets coupled to one another, each including a sun gear, a ring gear and a planetary gear carrier, on which planetary gears that mesh with said sun gear and said ring gear are rotatably mounted. The two sun gears of the main gear set are permanently connected to one another, form the first shaft of the main gear set, and are permanently connected to the third clutch and the fourth clutch such that the first shaft of the main gear set can optionally be connected to two different elements of the upstream gear set. The planetary gear carrier of the second planetary gear set in the main gear set forms the second shaft of the main gear set, and is permanently connected to the output shaft and to the first clutch. The ring gear of the second planetary gear set in the main gear set forms the third shaft of the main gear set, and is permanently connected to the first brake and the second clutch such that the third shaft of the main gear set can optionally be fixed on the transmission housing or connected to the upstream gear set. The planetary gear carrier of the first planetary gear set in the main gear set forms the fourth shaft of the main gear set, and is permanently connected to the input shaft. The ring gear of the first planetary gear set in the main gear set forms the fifth shaft of the main gear set, and is permanently connected to the first clutch such that the fifth shaft of the main gear set is connectable to the second shaft of the main gear set which forms the output shaft of the transmission.

The upstream gear set of US 2016/0160964 A1 includes two individual negative or minus planetary gear sets coupled to one another, each including a sun gear, a ring gear and a planetary gear carrier, on which planetary gears that mesh with said sun gear and said ring gear are rotatably mounted. The two sun gears of the upstream gear set are permanently connected to one another, form the first shaft of the upstream gear set, and are permanently connected to the first brake, so that the first shaft of the upstream gear set is fixable on the transmission housing. The planetary gear carrier of the first planetary gear set in the upstream gear set forms the second shaft of the upstream gear set and is permanently connected to the input shaft. The ring gear of the first planetary gear set in the upstream gear set and the planetary gear carrier of the second planetary gear set in the upstream gear set are permanently connected to one another, form the third shaft of the upstream gear set, and are permanently connected to the second clutch and the fourth clutch such that the third shaft of the upstream gear set is connectable to the third shaft of the main gear set by engaging the second clutch and to the first shaft of the main gear set by engaging the fourth clutch. The ring gear of the second planetary gear set in the upstream gear set forms the fourth shaft of the upstream gear set, and is permanently connected to the third clutch such that the fourth shaft of the upstream gear set is connectable to the first shaft of the main gear set by engaging the third clutch.

SUMMARY OF THE INVENTION

Therefore, the object of the present invention is to further develop the automatic transmission known from US 2016/0160964 A1 with respect to the number of gears.

Accordingly, an automatic transmission is proposed, particularly r for a motor vehicle, including a transmission housing, a drivable first rotatable shaft, a second rotatable shaft forming an output of the automatic transmission, four planetary gear sets, and seven shift elements for shifting into different gear ratios between the first shaft and the second shaft. The first rotatable shaft can also be referred to as the transmission input shaft; the second rotatable shaft can also be referred to as the transmission output shaft or the transmission outlet shaft. The first rotatable shaft is drivable by an internal combustion engine and/or an electric motor, for example. Each of the four planetary gear sets includes first, second and third elements. As is generally known, the "elements of a planetary gear set" are the sun gear, the planetary gear carrier and the ring gear of said planetary gear set.

With respect to the connections between the individual elements of the planetary gear sets and for the formation of the individual shafts of the automatic transmission, the following is provided:

The second element of the second planetary gear set forms the first rotatable shaft of the automatic transmission. The second element of the third planetary gear set forms the second rotatable shaft of the automatic transmission. The first element of the first planetary gear set and the first element of the second planetary gear set are permanently connected to one another and form a third rotatable shaft of the automatic transmission. The third element of the third planetary gear set forms a fourth rotatable shaft of the automatic transmission. The second element of the first planetary gear set and the third element of the second planetary gear set are permanently connected to one another and form a fifth rotatable shaft of the automatic transmission. The third element of the first planetary gear set forms a sixth rotatable shaft of the automatic transmission. The first element of the third planetary gear set and the first element of the fourth planetary gear set are permanently connected to one another and form a seventh rotatable shaft of the automatic transmission. The third element of the fourth planetary gear set forms an eighth rotatable shaft of the automatic transmission.

All four planetary gear sets are preferably negative or minus planetary gear sets, the respective planetary gears of which mesh with the sun gear and the ring gear of the respective planetary gear set. This allows for a particular installation space-saving, i.e. compact, and also cost-saving design of the automatic transmission.

As an alternative to the design of the gear set system with four individual minus planetary gear sets, individual minus planetary gear sets are replaceable by a positive or plus planetary gear set, which makes alternative spatial arrangements of individual shift elements within the transmission housing possible. As is well-known, a positive or plus planetary gear set includes a planetary gear carrier with inner and outer planetary gears rotatably mounted thereon, whereby each of the inner planetary gears respectively meshes with one outer planetary gear and with the sun gear of the plus planetary gear set, while each of the outer planetary gears respectively meshes with one inner planetary gear and with the ring gear of the plus planetary gear set. As an alternative to the design of the gear set system with four individual minus planetary gear sets, it is also possible to replace multiple minus planetary gear sets with plus planetary gear sets.

To ensure the same kinematics of the claimed gear set system, it is provided that the first element of each negative or minus planetary gear set and the first element of each plus planetary gear set is a sun gear, that the second element of each minus planetary gear set is a planetary gear carrier, while the second element of each plus planetary gear set is a ring gear, and that the third element of each minus planetary gear set is a ring gear, while the third element of each plus planetary gear set is a planetary gear carrier.

With respect to the connection of the seven shift elements to the individual rotatable shafts of the automatic transmission, the following is provided:

The first shift element is disposed in the power flow between the third rotatable shaft and the transmission housing, so that the first element of the first planetary gear set together with the first element of the second planetary gear set are fixable on the transmission housing by engaging the first shift element. The second shift element is disposed in the power flow between the fourth rotatable shaft and the transmission housing, so that the third element of the third planetary gear set is fixable on the transmission housing by engaging the second shift element. The third shift element is disposed in the power flow between the second and the eighth rotatable shafts, so that the third element of the fourth planetary gear set is connectable to the second element of the third planetary gear set and the output of the automatic transmission by engaging the third shift element. The fourth shift element is disposed in the power flow between the fourth and the fifth rotatable shafts, so that, by engaging the fourth shift element, the third element of the third planetary gear set is connectable to the second element of the first planetary gear set that is permanently connected to the third element of the second planetary gear set. The fifth shift element is disposed in the power flow between the fifth and the seventh rotatable shafts, so that, by engaging the fifth shift element, the first element of the third planetary gear set together with the first element of the fourth planetary gear set are connectable to the second element of the first planetary gear set that is permanently connected to the third element of the second planetary gear set. The sixth shift element is disposed in the power flow between the sixth and the seventh rotatable shafts, so that, by engaging the sixth shift element, the first element of the third planetary gear set together with the first element of the fourth planetary gear set are connectable to the third element of the first planetary gear set. According to the invention, the seventh shift element, which is additional compared to the generic US 2016/0160964 A1, is permanently connected to the third planetary gear set.

Within the context of coupling a shift element to a planetary gear set, the wording "permanently connected" is understood to mean that the input or output element of the respective shift element is directly connected to one of the elements of the respective planetary gear set by a torque-proof or torsionally flexible connection, so that there is always a constant speed correlation between said planetary gear set element and the input or output element of said shift element.

Within the context of coupling a shift element to a shaft, the wording "permanently connected" is understood to mean that the input or output element of the respective shift element is directly connected to the respective shaft by a torque-proof or torsionally flexible connection, so that there is always a constant speed correlation between said shaft and the input or output element of said shift element.

Within the context of coupling a planetary gear set to another planetary gear set, the wording "permanently connected" is understood to mean that one of the elements of the respective planetary gear set is directly connected to one of the elements of the respective other planetary gear set by a torque-proof or torsionally flexible connection, so that there is always a constant speed correlation between the two planetary gear set elements.

Within the context of coupling a planetary gear set element or a shift element to the housing, the wording "permanently connected" is understood to mean that the respective planetary gear set element or the output element of the respective shift element is directly connected to the housing by a torque-proof or torsionally flexible connection, so that the respective planetary gear set element or the output element of the respective shift element is always stationary.

In the automatic transmission according to the invention, it is preferred that three of the seven shifting elements are engaged in each gear. When shifting from one gear to the next higher or lower gear, in each case only one of the previously engaged shift elements is disengaged and one previously disengaged shift element is engaged, so that, for sequential up or downshifting by one respective gear, grouped shifting is avoided.

In a first preferred embodiment of the invention, the seventh shift element, which is additional compared to the generic US 2016/0160964 A1, is disposed in the power flow between the fourth and the sixth rotatable shaft.
In this case thirteen forward gears and one reverse gear are advantageously shiftable, for example by the following shift logic:

In the first forward gear, the second, fifth and seventh shift elements are torque transmitting; in the second forward gear, the second, fifth and sixth shift elements are torque transmitting; in the third forward gear, the first, second, and fifth shift elements are torque transmitting; in the fourth forward gear, the first, second, and sixth shift elements are torque transmitting; in the fifth forward gear, the first, second and third shift elements are torque transmitting; in the sixth forward gear, the first, third, and sixth shift elements are torque transmitting; in the seventh forward gear, the first, third and fifth shift elements are torque transmitting; in the eighth forward gear, the third, fourth and fifth shifts element are torque transmitting; in the ninth forward gear, the first, third and fourth shift elements are torque transmitting; in the tenth forward gear, the first, fourth and fifth shift elements are torque transmitting; in the eleventh forward gear, the first, fourth and sixth shift elements are torque transmitting; in the twelfth forward gear, the first, fifth and seventh shift elements are torque transmitting; in the thirteenth forward gear, the first, sixth and seventh shift elements are torque transmitting; in the reverse gear, the second, fourth and sixth shift elements are torque transmitting. Compared to the generic US 2016/0160964 A1, there is thus an additional launching gear with an advantageously high gear ratio for increased driving power and two additional overdrive gears with an advantageously low gear ratio for a further engine speed reduction.

In a second preferred embodiment of the invention, the seventh shift element, which is additional compared to the generic US 2016/0160964 A1, is disposed in the power flow between the fourth and the seventh rotatable shafts. In the engaged state, therefore, the seventh shift element interlocks the third planetary gear set, a state in which the first, second and third elements of the third planetary gear set rotate at the same speed. In an advantageous manner, eleven forward gears and one reverse gear are shiftable, for example by the following shift logic:

In the first forward gear, the second, fifth and sixth shift elements are torque transmitting; in the second forward gear, the first, second and fifth shift elements are torque transmitting; in the third forward gear, the first, second, and sixth shift elements are torque transmitting; in the fourth forward gear, the first, second, and third shift elements are torque transmitting; in the fifth forward gear, the first, third, and sixth shift elements are torque transmitting; in the sixth forward gear, the first, third, and fifth shift elements are torque transmitting; in the seventh forward gear, the third, fourth and fifth shift elements are torque transmitting; in the eighth forward gear, the first, third and fourth shift elements are torque transmitting; in the ninth forward gear, the first, fourth and fifth shift elements are torque transmitting; in the tenth forward gear, the first, fourth and sixth shift elements are torque transmitting; in the eleventh forward gear, the first, sixth and seventh shift elements are torque transmitting; in the reverse gear, the second, fourth and sixth shift elements are torque transmitting. Compared to the generic US 2016/0160964 A1, there is thus an additional overdrive gear with an advantageously low gear ratio for a further engine speed reduction.

In a third preferred embodiment of the invention, the seventh shift element, which is additional compared to the generic US 2016/0160964 A1, is disposed in the power flow between the second and the fourth rotatable shafts. Here too, in the engaged state, the seventh shift element interlocks the third planetary gear set, a state in which the first, second and third elements of the third planetary gear set rotate at the same speed. Eleven forward gears and one reverse gear are likewise advantageously shiftable, for example by the same shift logic that has already been discussed for the second preferred embodiment.

In a fourth preferred embodiment of the invention, the seventh shift element, which is additional compared to the generic US 2016/0160964 A1, is disposed in the power flow between the second and the seventh rotatable shafts. Here too, in the engaged state, the seventh shift element interlocks the third planetary gear set, a state in which the first, second and third elements of the third planetary gear set rotate at the same speed. Eleven forward gears and one reverse gear are likewise advantageously shiftable, for example by the same shift logic that has already been discussed for the second preferred embodiment.

In a fifth preferred embodiment of the invention, the seventh shift element, which is additional compared to the generic US 2016/0160964 A1, is disposed in the power flow between the second and the sixth rotatable shafts. In this case, twelve forward gears and one reverse gear are advantageously shiftable, for example by the following shift logic:

In the first forward gear, the second, fifth and seventh shift elements are torque transmitting; in the second forward gear, the second, fifth and sixth shift elements are torque transmitting; in the third forward gear, the first, second, and fifth shift elements are torque transmitting; in the fourth forward gear, the first, second, and sixth shift elements are torque transmitting; in the fifth forward gear, the first, second and third shift elements are torque transmitting; in the sixth forward gear, the first, third, and sixth shift elements are torque transmitting; in the seventh forward gear, the first, third and fifth shift elements are torque transmitting; in the eighth forward gear, the third, fourth and fifth shift elements are torque transmitting; in the ninth forward gear, the first, third and fourth shift elements are torque transmitting; in the tenth forward gear, the first, fourth and fifth shift elements are torque transmitting; in the eleventh forward gear, the first, fourth and sixth shift elements are torque transmitting; in the twelfth forward gear, the first, sixth and seventh shift elements are torque transmitting; in the reverse gear, the second, fourth and sixth shift elements are torque transmitting. In contrast to the generic US 2016/0160964 A1, there is thus an additional launching gear with an advantageously high gear ratio for increased driving power, and also an additional overdrive gear with an advantageously low gear ratio for an additional engine speed reduction.

In a sixth preferred embodiment of the invention, the seventh shift element, which is additional compared to the generic US 2016/0160964 A1, is disposed in the power flow between the second and the fifth rotatable shafts.
In this case, ten forward gears and two reverse gears are advantageously shiftable. For the ten forward gears the shift logic known from the generic US 2016/0160964 A1 is usable, according to which, in the first forward gear, the second, fifth and sixth shift elements are torque transmitting; in the second forward gear, the first, second and fifth shift elements are torque transmitting; in the third forward gear, the first, second, and sixth shift elements are torque transmitting; in the fourth forward gear, the first, second, and third shift elements are torque transmitting; in the fifth forward gear, the first, third, and sixth shift elements are torque transmitting; in the sixth forward gear, the first, third, and fifth shift elements are torque transmitting; in the seventh forward gear, the third, fourth, and fifth shift elements are torque transmitting; in the eighth forward gear, the first, third and fourth shift elements are torque transmitting; in the ninth forward gear, the first, fourth and fifth shift elements are torque transmitting, and in the tenth forward gear, the first, fourth and sixth shift elements are torque transmitting. As the shift logic for the two reverse gears, it can be provided that, in the first reverse gear, the second, fourth and sixth shift elements are torque transmitting, while in the second reverse gear, the second, sixth and seventh shift elements are torque transmitting. The second reverse gear, which is additional compared to the generic US 2016/0160964 A1, makes it possible to structurally provide a comparatively high launching torque ratio with correspondingly higher driving power for the first reverse gear, so that, if this high driving power is not needed, the second reverse gear is available for "normal" launching.

As for the generic US 2016/0160964 A1, the first and the second planetary gear set in the present case form an upstream gear set, which is a two connections-four shafts planetary transmission, is permanently connected to the first rotatable shaft or the transmission input shaft and is a so-called Simpson planetary gear set. As for the generic US 2016/0160964 A1, the third and the fourth planetary gear sets form a main gear set, configured as a two connections-five shafts planetary transmission, permanently connected to the first rotatable shaft (transmission input shaft) and permanently connected to the second rotatable shaft (transmission output shaft), and is similar to a Simpson planetary gear set. In contrast to the generic US 2016/0160964 A1, the third planetary gear set is additionally permanently connected to the seventh shift element, so that the third planetary gear set can either be interlocked or one of its elements is drivable with an additional output speed of the upstream gear set.

In contrast to the generic state of the art, the automatic transmission according to the invention thus includes independent kinematics, with which, by using the seven shift elements and as a function of their kinematic connection, it is now possible to shift into at least one additional gear.

As long as the inventive kinematics of the coupling of the four planetary gear sets amongst one another, to the seven shift elements, to the first rotatable shaft or transmission input shaft and to the second rotatable shaft or transmission output shaft is maintained, the spatial arrangement of the planetary gear sets and shift elements within the transmission housing is widely variable.

In one embodiment therefore, for the spatial arrangement of the four planetary gear sets in the transmission housing, it is proposed that all four planetary gear sets be arranged coaxially adjacent to one another in the defined sequence "first, second, third, fourth planetary gear set", which allows all clutches and brakes to be supplied with the pressurizing medium required for hydraulic actuation in a comparatively simple manner. For an application with coaxially aligned transmission input and transmission output shafts, it is useful for the first planetary gear set to be the planetary gear set of the planetary gear set group that faces the drive of the automatic transmission. Of course, other spatial arrangements of the four planetary gear sets in the transmission housing of the automatic transmission are possible as well.

In one embodiment for the spatial arrangement of the shift elements in the transmission housing, it is proposed that the inventively additional seventh shift element be disposed in an area axially between the second and the third planetary gear set.

If the seventh shift element is coupled to the sixth rotatable shaft, i.e. disposed in the power flow between the fourth and the sixth rotatable shafts or in the power flow between the second and the sixth rotatable shafts, the fifth, sixth and seventh shift elements form a clutch assembly, which is pre-assembled in a manner advantageous in terms of production engineering and includes a disc carrier which is common for the fifth and sixth shift elements, a disc carrier which is common for the sixth and seventh shift elements, a disc pack with the inner and outer clutch discs of the fifth shift element, an actuation device of the fifth shift element that acts on the disc pack of the fifth shift element, a disc pack with the inner and outer clutch discs of the sixth shift element an actuation device of the sixth shift element that acts on the disc pack of the sixth shift element, a disc pack with the inner and outer clutch discs of the seventh shift element and an actuation device of the seventh shift element that acts on the disc pack of the seventh shift element.

If the seventh shift element is coupled to the fourth rotatable shaft, i.e. disposed in the power flow between the fourth and the seventh rotatable shafts or in the power flow between the second and the fourth rotatable shafts, the second, fourth and seventh shift elements form a clutch assembly, which is pre-assembled in a manner advantageous in terms of production engineering and includes a disc carrier which is common for the second, fourth and seventh shift elements, a disc pack with the inner and outer clutch discs of the fourth shift element, an actuation device of the fourth shift element that acts on the disc pack of the fourth shift element, a disc pack with the inner and outer clutch discs of the seventh shift element and an actuation device of the seventh shift element that acts on the disc pack of the seventh shift element.

If the seventh shift element is coupled to the fifth rotatable shaft, i.e. disposed in the power flow between the second and the fifth rotatable shafts, the second, fourth and seventh shift elements can form a clutch assembly, which can be pre-assembled in a manner advantageous in terms of production engineering and includes a disc carrier which is common for the second and fourth shift elements, a disc carrier which is common for the fourth and seventh shift elements, a disc pack with the inner and outer clutch discs of the fourth shift element, an actuation device of the fourth shift element that acts on the disc pack of the fourth shift element, a disc pack with the inner and outer clutch discs of the seventh shift element and an actuation device of the seventh shift element that acts on the disc pack of the seventh shift element.

If the inventively additional seventh shift element is permanently connected to the second element of the third planetary gear set, it can also be useful, in spatial terms, to dispose the seventh shift element in an area axially between the third and the fourth planetary gear sets, preferably axially adjacent to the third planetary gear set.

The shift elements being used are configurable as powershifting clutches or brakes. Particularly, force-locking clutches or brakes—such as e.g. multi-disc clutches, band brakes and/or cone clutches—are usable. For the shift elements, however, positive-locking brakes and/or clutches—such as e.g. synchronizations or dog clutches—are usable as well. In particular, the inventively additional seventh shift element is well-suited as a dog clutch, because it only needs to engage the highest forward gear; i.e. it only has to shift a low differential speed.

All proposed designs and embodiments of an automatic transmission according to the invention, in particular for passenger cars, exhibit practicable gear ratios with a very high overall transmission ratio spread in gear spacing that is favorable in terms of drivability, which has a positive effect on the desired low fuel consumption. The automatic transmission according to the invention is further characterized by a low number of shift elements in relation to the number of gears and a comparatively low construction expenditure. The automatic transmission according to the invention is also characterized by good efficiency, among other things as a result of the comparatively low drag losses at the shift elements.

With the automatic transmission according to the invention, it is advantageously possible to realize launching the motor vehicle both with a transmission-external launching element and with a transmission-internal frictional shift element. In a per se known manner, a transmission-external launching element is configurable, for example, as a hydrodynamic torque converter (preferably with a converter lock-up clutch), as a dry launching clutch, as a wet launching clutch, as a magnet particle clutch, or as a centrifugal clutch. Alternative to the arrangement of such a launching element in power flow direction between the drive motor and the automatic transmission, the transmission-external launching element in power flow direction can also be disposed, viewed in power flow direction, behind the automatic transmission whereby the transmission input shaft of the automatic transmission is permanently connected to a crankshaft of the drive motor in a torsion-resistant or torsionally elastic manner. The second shift element, which is a brake and is torque transmitting in the first four forward gears and in the reverse gear, or in both reverse gears, is particularly suitable as a transmission-internal launching element.

The automatic transmission according to the invention is furthermore designed to allow adaptability to a variety of drive train configurations, both with respect to power flow direction and spatial terms. Depending on the stationary carrier transmission ratio of the individual planetary gear sets, different ratio spacings can thus result from the same transmission diagram, so that application- or vehicle-specific modification is made possible. Without special structural measures, it is furthermore possible to optionally arrange the drive and output of the automatic transmission coaxially or axis-parallel to one another. An axle differential and/or a transfer differential is disposable on the input side or on the output side of the automatic transmission. It is also possible to provide additional freewheels at any suitable location of the automatic transmission, for example between a rotatable shaft and the transmission housing, or to optionally connect two rotatable shafts. It is also possible to dispose a wear-free brake, such as e.g. a hydraulic or electric retarder or the like, on each rotatable shaft, preferably on the transmission input shaft or on the transmission output shaft. This is important in particular for use in commercial vehicles. To power additional units, an auxiliary output can also be provided on each rotatable shaft, preferably on the transmission input shaft or on the transmission output shaft.

Another advantage of the automatic transmission according to the invention is that an electric motor can additionally be mounted on many rotatable shafts as a generator and/or as an additional drive motor. It is generally possible to couple such an electric motor directly to the first and/or the second rotatable shaft of the automatic transmission in a structurally very simple manner. The proposed gear set concept also allows such an electric motor to be coupled directly to the fourth and/or the fifth rotatable shaft in a structurally very simple manner, however. If such an electric motor is coupled directly to the fourth or the fifth rotatable shaft, said electric motor can advantageously also take over the function of electrodynamic gear shifting, in which the electric motor EM takes over the respective power shifting, i.e. produces or supports the supporting torque occurring in the respective shifting progression.

BRIEF DESCRIPTION OF THE DRAWINGS

Using the drawings as examples, the exemplary embodiments of the present invention will be explained in more detail in the following. Identical or comparable components are also provided with the same reference numerals. The following is shown:

FIG. 1A shows a schematic illustration of an automatic transmission in accordance with the state of the art;

FIG. 1B shows an engagement sequence diagram for the automatic transmission according to FIG. 1A;

FIG. 2AB shows a schematic illustration of the first design example of an automatic transmission shown in FIG. 2A with a positive planetary gear set as a second planetary gear set according to the invention;

FIG. 2AC shows a schematic illustration of the first design example of an automatic transmission shown in FIG. 2A with a positive planetary gear set as a third planetary gear set according to the invention;

FIG. 2AD shows a schematic illustration of the first design example of an automatic transmission shown in FIG. 2A with a positive planetary gear set as a fourth planetary gear set according to the invention;

FIG. 2B shows an engagement sequence diagram for the automatic transmission according to FIG. 2A;

FIG. 3B shows an engagement sequence diagram for the automatic transmission according to FIG. 3A;

FIG. 4AA shows a schematic illustration of the third design example of an automatic transmission shown in FIG. 4A with a rotor of an electric motor being connected to a second shaft according to the invention;

FIG. 4AB shows a schematic illustration of the third design example of an automatic transmission shown in FIG. 4A with a rotor of an electric motor being connected to a fourth shaft according to the invention;

FIG. 4AC shows a schematic illustration of the third design example of an automatic transmission shown in FIG. 4A with a rotor of an electric motor being connected to a fifth shaft according to the invention;

FIG. 4B shows an engagement sequence diagram for the automatic transmission according to FIG. 4A;

FIG. 5B shows an engagement sequence diagram for the automatic transmission according to FIG. 5A;

FIG. 6B shows an engagement sequence diagram for the automatic transmission according to FIG. 6A;

FIG. 7B shows an engagement sequence diagram for the automatic transmission according to FIG. 7A.

DETAILED DESCRIPTION

Figure 2A:
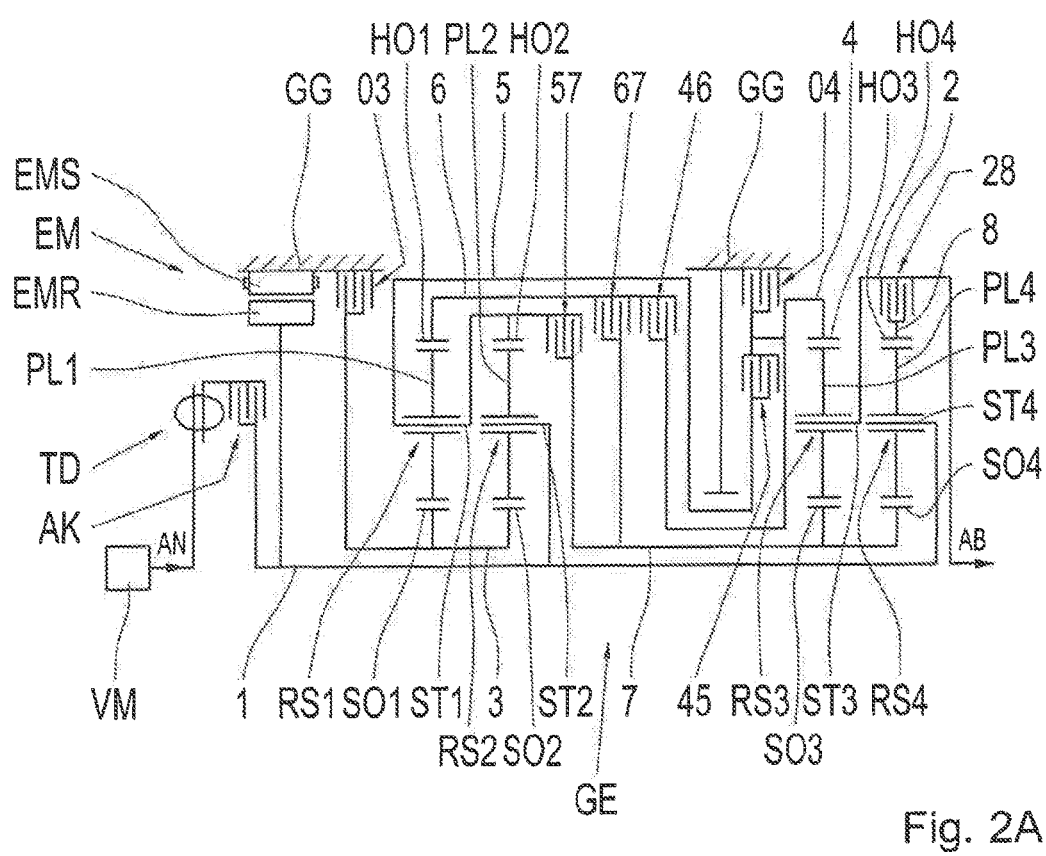
FIG. 2A shows a schematic illustration of a first design example of an automatic transmission according to the invention.
Figure 2A:
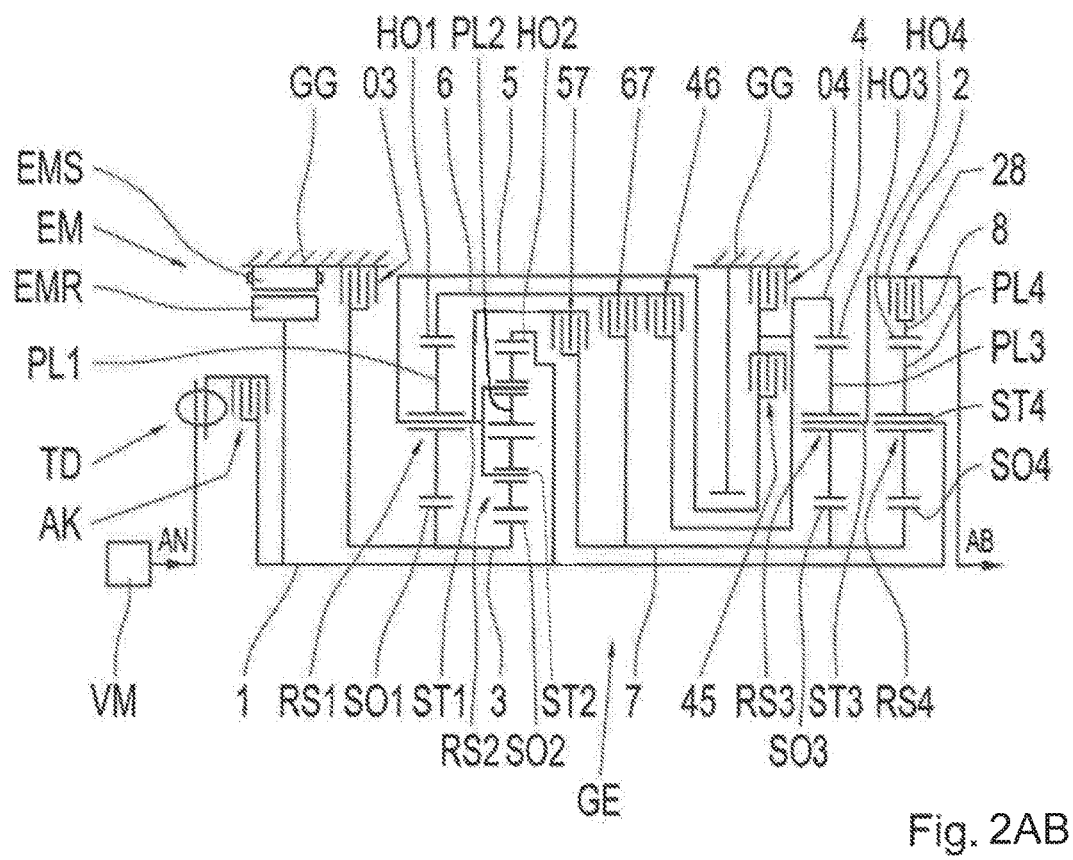
Figure 2A:
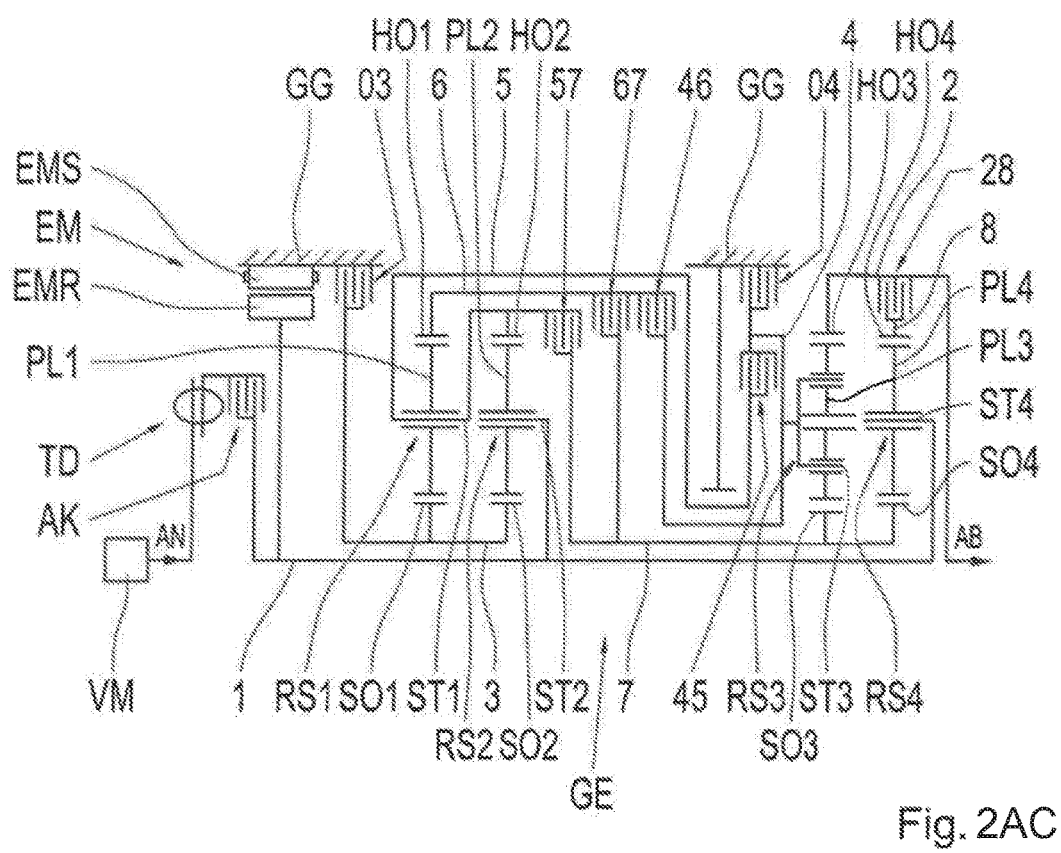
Figure 2A:
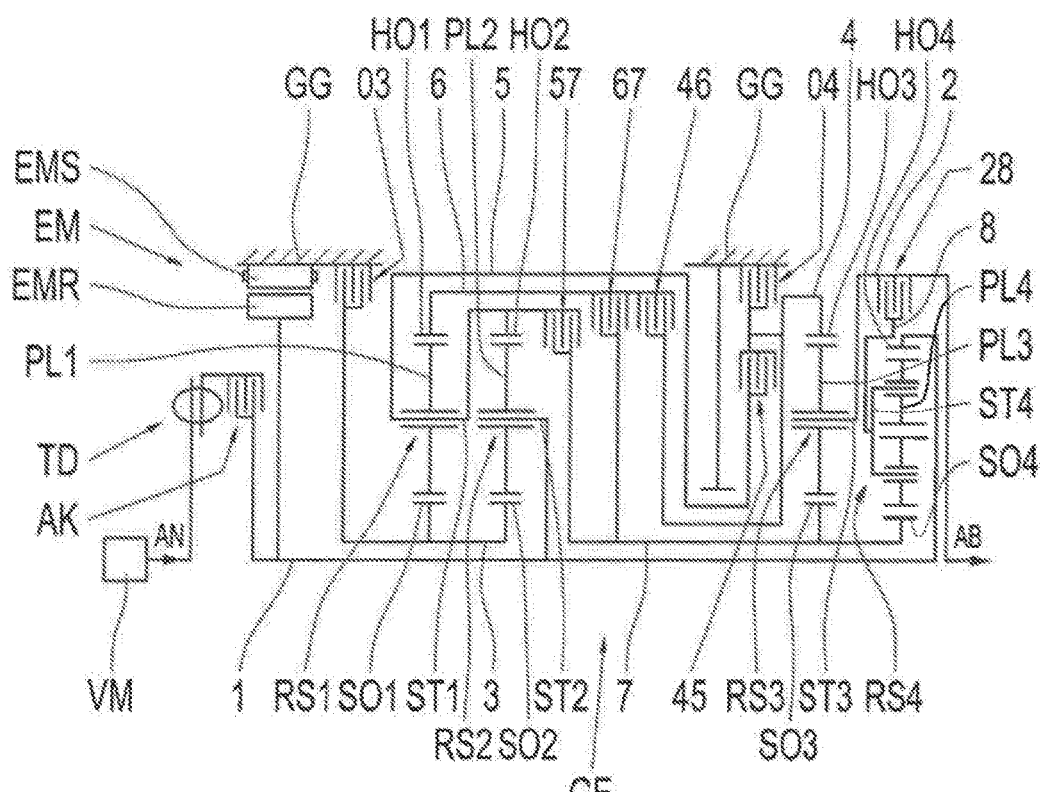

FIGS. 1A and 1B show the transmission diagram and the shift logic for the automatic transmission with ten forward gears and one reverse gear known from the state of the art of US 2016/0160964 A1, as already described in detail at the beginning of the patent application.

Six different design examples for an automatic transmission according to the invention will be described in more detail in the following with the aid of FIGS. 2A/2B, 3A/3B, 4A/4B, 5A/5B, 6A/6B and 7A/7B. Common to all six design examples is that, as an example, the planetary gear sets used within the scope of the inventive gear set system are all simple negative or minus planetary gears sets, each including three elements, wherein the first element is always a sun gear, the second element is a planetary gear carrier and the third element is a ring gear. The person skilled in the art is aware that individual minus planetary gear sets are replaceable with a positive or plus planetary gear set without changing the kinematics of the gear set system, as long as the provided individual connections of the respective elements of the planetary gear set concerned are maintained. Using the stated definitions for the elements of the minus planetary gear sets, to ensure the same kinematics for the gear set system it suffices, for example, if the first element of each plus planetary gear set is a sun gear, the second element of each plus planetary gear set is a ring gear and the third element of each plus planetary gear set is a planetary gear carrier. As is known, the only limits presented to the skilled person with respect to the exchangeability of minus and plus planetary sets are the connectability of the individual elements of the planetary gear sets to the elements of the other planetary gear sets provided in the gear set system and to the individual shift elements, as well as—if provided—to the transmission input shaft and the transmission output shaft. Non-connectable configurations, in which rotatable shafts of the transmission cross, are easily identifiable by a skilled person and allows the person skilled in the art to distinguish between technically valuable configurations and technically rather worthless configurations.

Common to all six design examples is also that the planetary gear sets used within the scope of the gear set system according to the invention are arranged, in spatial terms for example axially behind one another, in the same sequence. The skilled person, however, is familiar with the idea of changing the sequence of the planetary gear sets as needed, for example to create connectability within the transmission or, for example, to adapt to different drive concepts with coaxial or axis-parallel arrangements of the transmission input shaft and the transmission output shaft. Again, the number of possible options for the sequence of the planetary gear sets is limited only by the connectability of the respective elements of the planetary gear sets to the elements of the other planetary gear sets provided in the gear set system and to the individual shift elements, as well as—if provided—to the transmission input shaft and the transmission output shaft. Here too, non-connectable variations, in which rotatable shafts of the transmission cross, are easily identifiable by the skilled person. The specialized knowledge also allows the person skilled in the art to distinguish between technically valuable modifications and technically rather worthless modifications.

FIG. 2A shows the transmission diagram of a first design example of an automatic transmission according to the invention in an exemplary drive train, particularly of a motor vehicle. The transmission configured as an automatic transmission is labeled as GE and includes eight rotatable shafts 1, 2, 3, 4, 5, 6, 7, 8, four planetary gear sets RS1, RS2, RS3, RS4 and seven shift elements 03, 04, 28, 45, 57, 67, 46, which are all disposed in a transmission housing GG of the transmission GE. The first rotatable shaft 1 is drivable and thus forms the transmission input shaft, while the second rotatable shaft 2 forms an output AB of the transmission GE.

The transmission GE is drivable by an internal combustion engine VM, which is shown in the figure in a very simplified manner, the speed and torque of which is transmitted to the input side clutch-half of a launching clutch AK via an input shaft AN with interposition of a torsion damper TD. The output side clutch-half of this launching clutch AK is connected to the first rotatable shaft 1 of the transmission GE, so that the launching clutch AK has to be properly engaged to transfer the drive power of the internal combustion engine VM to the transmission GE. As an alternative to the launching clutch AK, it is also possible to provide other launching elements disposed in the power flow between the internal combustion engine VM and the first rotatable shaft 1 of the transmission GE; for example, a torque converter, preferably with a converter lock-up clutch.

The design example shown in FIG. 2A additionally includes an electric drive. An electric motor EM is provided for this purpose, the rotor EMR of which is connected to the first rotatable shaft 1 of the transmission GE and the stator EMS of which is mounted on the transmission housing GG.

The four planetary gear sets RS1 to RS4 of the transmission GE are disposed in spatial terms, as an example, axially behind one another in the exemplary sequence "RS1-RS2-RS3-RS4", whereby the first planetary gear set RS1 is disposed on the input side of the transmission GE and the fourth planetary gear set RS4 is disposed on the output side of the transmission GE. In another configuration of the transmission, while maintaining the kinematics, the four planetary gear sets are disposable in a modified sequence, which is particularly useful when the transmission input and the transmission output shaft in the transmission should not be disposed coaxially to one another.

The first and second planetary gear set RS1, RS2 kinematically form an upstream gear set that is permanently connected to the first rotatable shaft 1 and is configured in a "two connections-four shafts planetary transmission" as a Simpson planetary gear set, including two sun gears SO1 and SO2, two planetary gear carriers ST1 and ST2 and two ring gears HO1 and HO2. The first and second planetary gear sets RS1, RS2 are both simple negative or minus planetary gear sets, respectively including three elements. The sun gear SO1 forms the first element of the first planetary gear set RS1, the sun gear SO2 forms the first element of the second planetary gear set RS2, the planetary gear carrier ST1 forms the second element of the first planetary gear set RS1, the planetary gear carrier ST2 forms the second element of the second planetary gear set RS2, the ring gear HO1 forms the third element of the first planetary gear set RS1, and the ring gear HO2 forms the third element of the second planetary gear set RS2. In accordance with the configuration as a minus planetary gear set, the planetary gears PL1 of the first planetary gear set RS1 are rotatably mounted on the planetary gear carrier ST1, whereby each of these planetary gears PL1 meshes with the sun gear SO1 and with the ring gear HO1. In the same way, the planetary gears PL2 of the second planetary gear set RS2 are rotatably mounted on the planetary gear carrier ST2, whereby each of these planetary gears PL2 meshes with the sun gear SO2 and with the ring gear HO2. As is typical for a Simpson planetary gear set, the sun gear SO1 of the first planetary gear set RS1 is permanently connected to the sun gear SO2 of the second planetary gear set RS2, while the planetary gear carrier ST1 of the first planetary gear set RS1 is permanently connected to the ring gear HO2 of the second planetary gear set RS2. In doing so, the planetary gear carrier ST2 of the second planetary gear set RS2 forms the drivable first rotatable shaft 1 of the transmission GE, the sun gear SO1 of the first planetary gear set RS1 together with the sun gear SO2 of the second planetary gear set RS2 form the third rotatable shaft 2 of the transmission GE, the planetary gear carrier of the first planetary gear set RS1 together with the ring gear HO2 of the second planetary gear set RS2 form the fifth rotatable shaft 5 of the transmission GE, the ring gear HO1 of the first planetary gear set RS1 forms the sixth rotatable shaft 6 of the transmission GE.

The third and the fourth planetary gear sets RS3, RS4 kinematically form a main gear set, which is permanently connected to the first rotatable shaft 1 and permanently connected to the second rotatable shaft 2 and is configured in a so-called two connections-five shafts planetary transmission similar a Simpson planetary gear set, including two sun gears SO3 and SO4, two planetary gear carriers ST3 and ST4 and two ring gears HO3 and HO4. The third and fourth planetary gear set RS3, RS4 are both simple negative or minus planetary gear sets, respectively including three elements. The sun gear SO3 forms the first element of the third planetary gear set RS3, the sun gear SO4 forms the first element of the fourth planetary gear set RS4, the planetary gear carrier ST3 forms the second element of the third planetary gear set RS3, the planetary gear carrier ST4 forms the second element of the fourth planetary gear set RS4, the ring gear HO3 forms the third element of the third planetary gear set RS3, the ring gear HO4 forms the third element of the fourth planetary gear set RS4. In accordance with the configuration as a minus planetary gear set, the planetary gears PL3 of the third planetary gear set RS3 are rotatably mounted on the planetary gear carrier ST3, whereby each of these planetary gears PL3 meshes with the sun gear SO3 and with the ring gear HO3. In the same way, the planetary gears PL4 of the fourth planetary gear set RS4 are rotatably mounted on the planetary gear carrier ST4, whereby each of these planetary gears PL4 meshes with the sun gear SO4 and with the ring gear HO4. As is the case for the Simpson planetary gear set, the sun gear SO3 of the third planetary gear set RS3 is permanently connected with the sun gear SO4 of the fourth planetary gear set RS4. In contrast to the Simpson planetary gear set, the planetary gear carrier ST3 of the third planetary gear set RS3 is not permanently connected to the ring gear HO4 of the fourth planetary gear set RS4, but is instead connectable via the third shift element 28 of the transmission GE, which is a clutch. In doing so, the planetary gear carrier ST3 of the third planetary gear set RS3 forms the second rotatable shaft 2, and thus the output AB of the transmission GE, while the ring gear HO4 of the fourth planetary gear set RS4 forms the eighth rotatable shaft 8 of the transmission GE. The two sun gears SO3, SO4 of the third and fourth planetary gear set RS3, RS4, which are permanently connected to one another, form the seventh rotatable shaft 7 of the transmission GE. The ring gear HO3 of the third planetary gear set RS3 forms the fourth rotatable shaft 4 of the transmission GE.

The first shift element 03 of the transmission GE is a brake and disposed in the power flow between the third rotatable shaft 3 of the transmission GE and the transmission housing GG, so that the sun gears SO1, SO2 of the first and second planetary gear set RS1, RS2, which are permanently connected to one another, are fixable on the transmission housing GG by engaging said first shift element 03.

The second shift element 04 of the transmission GE is a brake and disposed in the power flow between the fourth rotatable shaft 4 of the transmission GE and the transmission housing GG, so that the ring gear HO3 of the third planetary gear set RS3 is fixable on the transmission housing GG by engaging said second shift element 04.

The third shift element 28 of the transmission GE is a clutch and disposed in the power flow between the eighth rotatable shaft 8 and the second rotatable shaft 2 of the transmission GE, so that the ring gear HO4 of the fourth planetary gear set RS4 is connectable to the planetary gear carrier ST3 of the third planetary gear set RS3, and thus to the output AB of the transmission GE, by engaging said third shift element 28.

The fourth shift element 45 of the transmission GE is a clutch and disposed in the power flow between the fifth rotatable shaft 5 and the fourth rotatable shaft 4 of the transmission GE, so that the planetary gear carrier ST1 of the first planetary gear set RS1 together with the ring gear HO2 of the second planetary gear set RS2 are connectable to the ring gear HO3 of the third planetary gear set RS3, by engaging said fourth shift element 45.

The fifth shift element 57 of the transmission GE is a clutch and disposed in the power flow between the seventh rotatable shaft 7 and the fifth rotatable shaft 5 of the transmission GE, so that the sun gears SO3, SO4 of the third and the fourth planetary gear set RS3, RS4, which are permanently connected to one another, are simultaneously connectable to the planetary gear carrier ST1 of the first planetary gear set RS1 and the ring gear HO2 of the second planetary gear set RS2 by engaging said fifth shift element 57.

The sixth shift element 67 of the transmission GE is a clutch and disposed in the power flow between the seventh rotatable shaft 7 and the sixth rotatable shaft 6 of the transmission GE, so that the sun gears SO3, SO4 of the third and the fourth planetary gear sets RS3, RS4, which are permanently connected to one another, are connectable to the ring gear HO1 of the first planetary gear set RS1 by engaging said sixth shift element 67.

The seventh shift element 46 of the transmission GE is a clutch and disposed in the power flow between the sixth rotatable shaft 6 and the fourth rotatable shaft 4 of the transmission GE, so that the ring gear of the third planetary gear set RS3 is connectable to the ring gear HO1 of the first planetary gear set RS1 by engaging said seventh shift element 46.

With respect to the spatial arrangement of the seven shift elements, FIG. 2A provides by way of example that the first shift element 03, which is a brake, is substantially disposed on the side of the first planetary gear set RS1 facing the drive, i.e. on the side of the first planetary gear set RS1 facing away from the second planetary gear set RS2. The external disc carrier of the brake 03 can be integrated into the transmission housing GG in a known manner. As a result of the arrangement of the brake 03 on a large diameter, the brake 03—in particular its disc pack—can, also viewed in axial direction, at least in part be disposed in an area radially above the upstream gear set.

The design example depicted in FIG. 2A further provides that the second shift element 04, which is a multi-disc brake, and the fourth shift element 45, which is a multi-disc clutch, together form an assembly, which in spatial terms is disposed axially adjacent to the third planetary gear set RS3, includes a common disc carrier, which is an inner disc carrier for the brake 04 and an external disc carrier for the clutch 45, and is connected to the ring gear HO3 of the third planetary gear set RS3. This common disc carrier and the ring gear HO3 are also designable as a one-piece component. The external disc carrier of the brake 04 can be integrated into the transmission housing GG in a known manner. In FIG. 2A, viewed in axial direction, the disc pack of brake 04 is disposed substantially radially above the disc pack of clutch 45, whereby the two disc packs are disposed in an area axially between the second and the third planetary gear sets RS2, RS3.

Alternatively, brake 04 and clutch 45 are also disposable axially adjacent to one another, whereby the brake 04 is then preferably disposed in an area radially above the third planetary gear set RS3 and the clutch 45 is disposed axially on the side of the third planetary gear set RS3 facing away from the fourth planetary gear set RS4.

The design example depicted in FIG. 2A further provides that the fifth shift element 57, which is a multi-disc clutch, the sixth shift element 67, which is a multi-disc clutch, and the seventh shift element 46, which is a multi-disc clutch, form a clutch assembly that can be pre-assembled in a manner advantageous in terms of production engineering and includes a first common disc carrier, which is an inner disc carrier for the fifth and sixth clutch 57, 67, and a second common disc carrier, which is an external disc carrier for the sixth and seventh clutch 67, 46. In spatial terms, this clutch assembly is disposed in an area axially between the second and the third planetary gear set RS2, RS3, more precisely in an area axially between the second planetary gear set RS2 and the assembly formed by the brake 04 and the clutch 45. In doing so, the disc pack of clutch 57 is disposed axially adjacent to the second planetary gear set RS2, while clutch 67 and clutch 46 form a type of dual clutch with disc packs that are disposed axially adjacent on the same diameter. Said dual clutch is disposed on the side of the disc pack of clutch 57 facing away from the second planetary gear set RS, whereby the disc pack of clutch 67 faces toward the second planetary gear set RS2 and the disc pack of clutch 46 faces toward the third planetary gear set RS3.

In accordance with its connection to the fourth rotatable shaft 4, in an alternative arrangement to that in FIG. 2A, the seventh shift element can also be integrated into the assembly with the second and fourth shift elements.

The design example depicted in FIG. 2A further provides that the third shift element 28, which is a multi-disc clutch, viewed in axial direction is at least with its disc pack disposed predominantly radially above the fourth planetary gear set RS4, which in terms of production engineering and in a cost-effective manner allows the inner disc carrier of the clutch 28 and the ring gear HO4 of the fourth planetary gear set RS4 to be a common component—for example in one piece.

FIGS. 2AB-2AC show alternative embodiments of the first design example of an automatic transmission shown in FIG. 2A. FIG. 2AB shows the second planetary gear set RS2 as a positive planetary gear set, with the sun gear SO2 forming the first element of the second planetary gear set RS2, the ring gear HO2 forming the second element of the second planetary gear set RS2, and the planetary carrier ST2 forming the third element of the second planetary gear set RS2. FIG. 2AC shows the third planetary gear set RS3 as a positive planetary gear set, with the sun gear SO3 forming the first element of the third planetary gear set RS3, the ring gear HO3 forming the second element of the third planetary gear set RS3, and the planetary carrier ST3 forming the third element of the third planetary gear set RS3. FIG. 2AD shows the fourth planetary gear set RS4 as a positive planetary gear set, with the sun gear SO4 forming the first element of the fourth planetary gear set RS4, the ring gear HO4 forming the second element of the fourth planetary gear set RS4, and the planetary carrier ST4 forming the third element of the fourth planetary gear set RS4.

With the total of seven shift elements 03, 04, 28, 45, 57, 67, 46, a selective shifting of thirteen forward gears and one reverse gear are realizable, which will be explained in more detail in the following with the aid of FIG. 2B. FIG. 2B shows an example of an engagement sequence diagram for the automatic transmission depicted in FIG. 2A. As indicated with X in the columns of FIG. 2B, which are allocated to the individual shift elements 03, 04, 28, 45, 57, 67, 46, three of the seven shift elements are engaged in each gear. In the first forward gear the shift elements 04, 57 and 46 are torque transmitting or engaged; in the second forward gear the shift elements 04, 57 and 67, in the third forward gear the shift elements 03, 04 and 57, in the fourth forward gear the shift elements 03, 04 and 67, in the fifth forward gear the shift elements 03, 04 and 28, in the sixth forward gear the shift elements 03, 28 and 67, in the seventh forward gear the shift elements 03, 28 and 57, in the eighth forward gear the shift elements 28, 45 and 57, in the ninth forward gear the shift elements 03, 28 and 45, in the tenth forward gear the shift elements 03, 45 and 57, in the eleventh forward gear the shift elements 03, 45 and 67, in the twelfth forward gear the shift elements 03, 57 and 46, in the thirteenth forward gear the shift elements 03, 67 and 46, in the reverse gear the shift elements 04, 45 and 67 are torque transmitting or engaged.

In accordance with this shift logic, grouped shifting is avoided in a sequential shifting mode, i.e. up or downshifting by one gear respectively, because two adjacent gear steps in the shift logic always share the use of two shift elements. Overall, these thirteen forward gears and the reverse gear are shiftable with gear ratios that are useful in practice. As a result of the minimization of the drag losses that unavoidably occur on disengaged frictional shift elements, the fact that three shift elements are engaged in each gear has a positive effect on the efficiency of the transmission.

In principle, the spatial arrangement of the seven shift elements 03, 04, 28, 45, 57, 67, 46 of the transmission GE within the transmission housing GG is widely variable and is limited only by the dimensions and the external shape of the transmission housing GG. Correspondingly, the component arrangement shown in FIG. 2A is expressly to be understood as only one of numerous possible component arrangement options. In the same way, the design of the shift elements shown in FIG. 2A as multi-disc clutches or multi-disc brakes is expressly to be understood as only being an example. In other embodiments, dog or cone clutches, which are shiftable in a positive-locking manner, band brakes which are shiftable in a friction-locking manner, or even dog or cone brakes, which are shiftable in a positive-locking manner, for example, are usable as well. The seventh shift element 46 is particularly suited to be a positive-locking clutch, because the seventh shift element 46 is needed only to form the smallest forward gear and the two largest forward gears. The first forward gear is usually engaged when the transmission output is stationary. During the gear change from the eleventh to the twelfth forward gear and vice versa, only a small differential speed has to be synchronized. Due to the shift logic of the transmission GE, the second shift element 04 is well suited for being a positive-locking shift element as well.

Figure 3A:
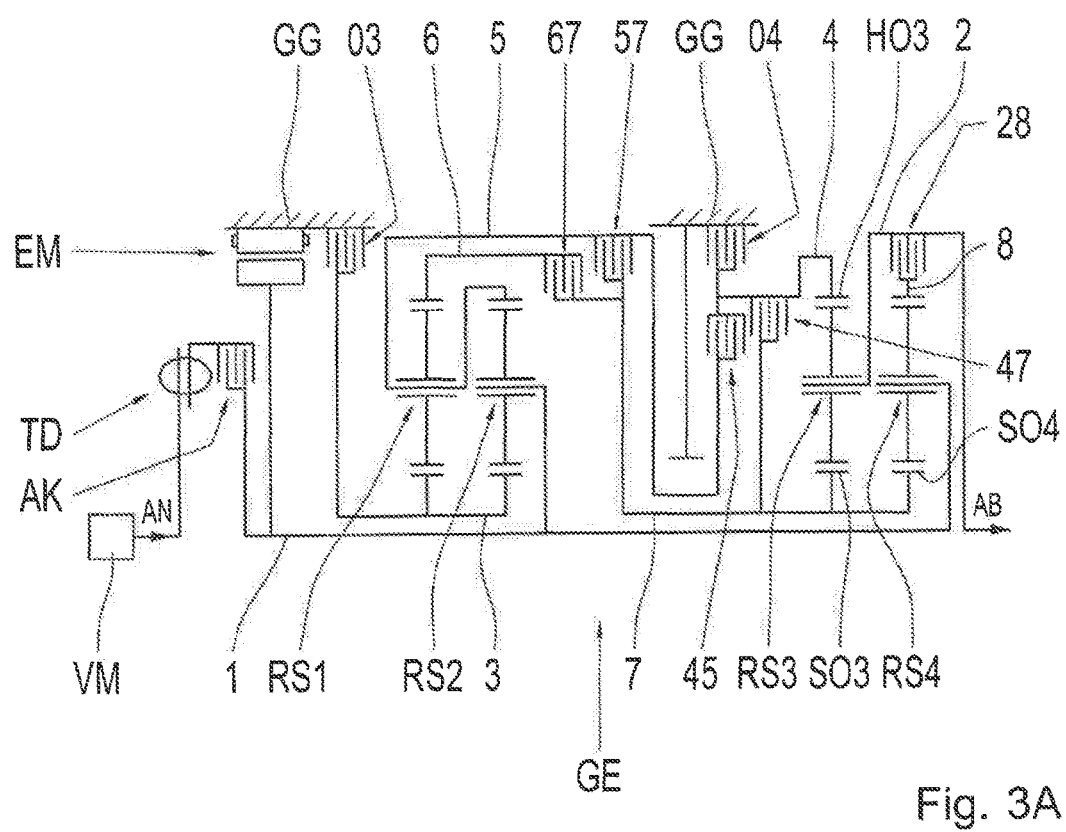
FIG. 3A shows a schematic illustration of a second design example of an automatic transmission according to the invention.

FIG. 3A shows the transmission diagram of a second design example of an automatic transmission according to the invention in an exemplary drive train, particularly of a motor vehicle. With respect to its kinematics, this second design example differs from the first design example of an automatic transmission according to the invention described in detail with the aid of FIG. 2A, only in the manner in which the seventh shift element is coupled. In contrast to FIG. 2A, a seventh shift element, labeled with 47 and disposed in the power flow between the seventh rotatable shaft 7 and the fourth rotatable shaft 4, is now provided for connecting the third planetary gear set RS3 to the upstream gear set. In the engaged state this seventh shift element 47, a clutch, thus now connects the ring gear HO3 of the third planetary gear set RS3 to the sun gears SO3, SO4 of the third and fourth planetary gear sets RS3, RS4, which are connected to one another. In the engaged state, therefore, the seventh shift element 47 interlocks the third planetary gear set RS3; a state in which the sun gear SO3, the planetary gear carrier ST3 and the ring gear HO3 of the third planetary gear set RS3 rotate at the same speed.

Also deviating from FIG. 2A is the spatial arrangement of the fifth, sixth and seventh shift elements 57, 67, 47 within the transmission housing GG depicted in FIG. 3A.

In the design example depicted in FIG. 3A, the second shift element 04, which is a multi-disc brake, the fourth shift element 45, which is a multi-disc clutch, and the seventh shift element 47, which is a multi-disc clutch, together form an assembly, which in spatial terms is disposed axially adjacent to the third planetary gear set RS3, on its side facing away from the fourth planetary gear set RS4, and includes a common disc carrier, which is an inner disc carrier for the brake 04, an external disc carrier for the clutch 45 and an external disc carrier for the seventh clutch 47, and is connected to the ring gear HO3 of the third planetary gear set RS3. This common disc carrier and the ring gear HO3 is also designable as a one-piece component. The external disc carrier of the brake 04 can be integrated into the transmission housing GG in a known manner. In FIG. 3A, viewed in axial direction, the disc pack of brake 04 is disposed substantially radially above the disc pack of clutch 45, while the disc pack of clutch 47 is disposed axially adjacent to the disc pack of clutch 45, whereby the disc pack of clutch 47 is disposed in closer proximity to the third planetary gear set RS3 than the disc pack of clutch 45.

Alternatively, viewed in axial direction, the brake 04 is also disposable radially above the clutch 47 or radially above the third planetary gear set RS3.

The design example depicted in FIG. 3A further provides that the fifth shift element 57, which is a multi-disc clutch, and the sixth shift element 67, which is a multi-disc clutch, form a clutch assembly in a dual clutch that can be pre-assembled in a manner advantageous in terms of production engineering and includes a common disc carrier, which as an example here is an inner disc carrier for the fifth and sixth clutches 57, 67. In spatial terms, this clutch assembly is disposed adjacent to the second planetary gear set RS2 in an area axially between the second and the third planetary gear sets RS2, RS3. In doing so, the disc pack of clutch 57 is disposed axially adjacent to the disc pack of clutch 67, whereby the disc pack 67 is disposed in closer proximity to the second planetary gear set RS2 than the disc pack of clutch 57.

Alternatively, viewed in axial direction, the disc pack of the sixth shift element 67 can also be disposed radially below the disc pack of the fifth shift element 57 in a structural length-saving manner.

With the total of seven shift elements 03, 04, 28, 46, 57, 67, 47, and as verified by the shift logic shown in FIG. 3B, the shifting of eleven forward gears without grouped shifting and also one reverse gear are realizable. As indicated with X in the columns of FIG. 3B, which are allocated to the individual shift elements 03, 04, 28, 45, 57, 67, 47, three of the seven shift elements are engaged in each gear. Therefore, in the first forward gear the shift elements 04, 57 and 67 are torque transmitting or engaged; in the second forward gear the shift elements 03, 04 and 57, in the third forward gear the shift elements 03, 04 and 67, in the fourth forward gear the shift elements 03, 04 and 28, in the fifth forward gear the shift elements 03, 28 and 67, in the sixth forward gear the shift elements 03, 28 and 57, in the seventh forward gear the shift elements 28, 46 and 57, in the eighth forward gear the shift elements 03, 28 and 45, in the ninth forward gear the shift elements 03, 45 and 57, and in the tenth forward gear the shift elements 03, 45 and 67 are torque transmitting or engaged. Therefore, in the eleventh forward gear, in which the seventh shift element 47 participates in gear generation, the shift elements 03, 67 and 47 are torque transmitting. In the reverse gear, the shift elements 04, 45 and 67 are torque transmitting.

In principle, the spatial arrangement of the four planetary gear sets RS1, RS2, RS3, RS4 and the seven shift elements 03, 04, 28, 45, 57, 67, 47 of the transmission GE within the transmission housing GG is widely variable and is limited only by the dimensions and the external shape of the transmission housing GG. Correspondingly, the component arrangement shown in FIG. 3A is also expressly to be understood as only one of numerous possible component arrangement options. In the same way, the design of the shift elements shown in FIG. 3A as multi-disc clutches or multi-disc brakes is expressly to be understood as only being an example. In other embodiments, dog or cone clutches, which are shiftable in a positive-locking manner, band brakes which are shiftable in a friction-locking manner, or even dog or cone brakes, which are shiftable in a positive-locking manner, for example, are usable as well. Both the seventh shift element 47 and the second shift element 04, for example, are well-suited for a design as positive-locking shift elements. The design of the seventh shift element as a positive-locking clutch thus uses the advantage provided by the kinematics of the transmission GE that the seventh shift element 27 is only engaged for the gear change from the tenth to the eleventh forward gear and is disengaged for the gear change from the eleventh to the tenth forward gear; i.e. only a small differential speed has to be synchronized in the gear change operation.

Figure 4A:
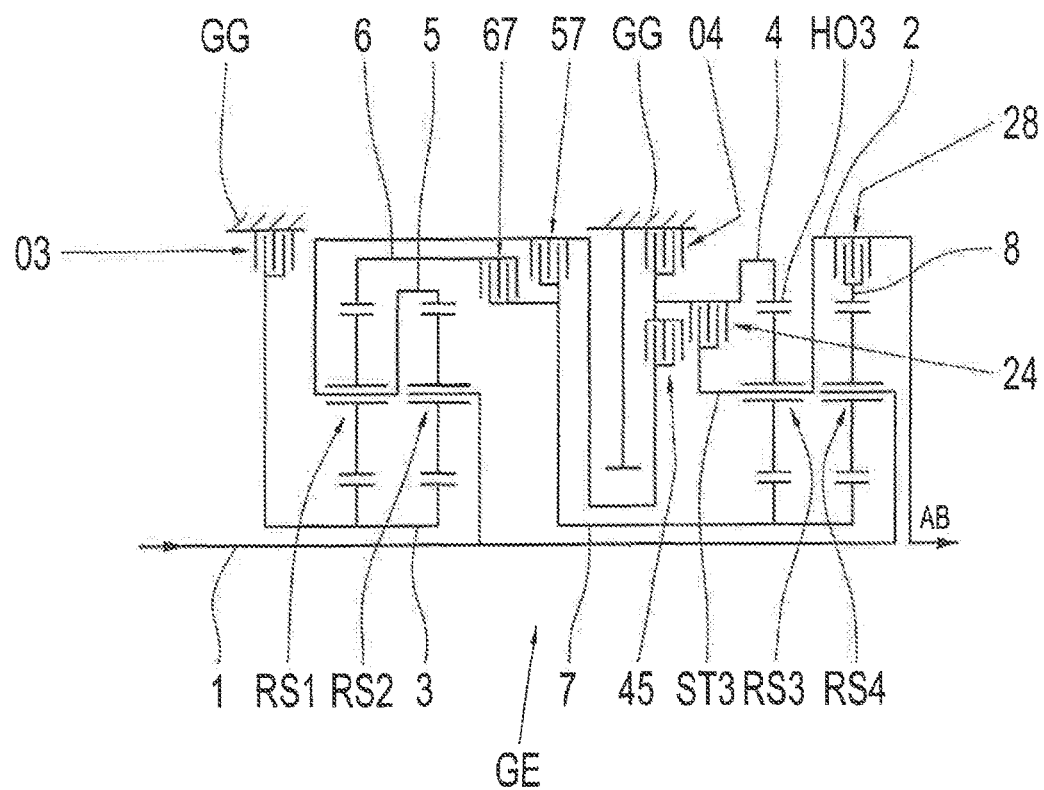
FIG. 4A shows a schematic illustration of a third design example of an automatic transmission according to the invention.
Figure 4A:
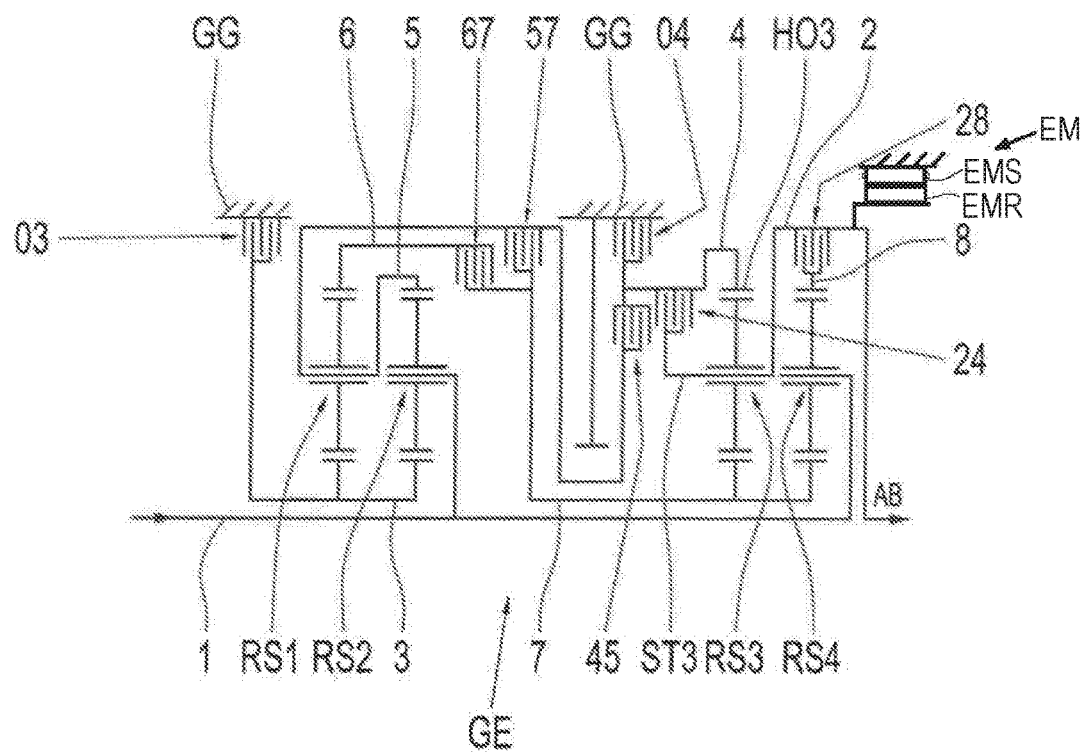
Figure 4A:
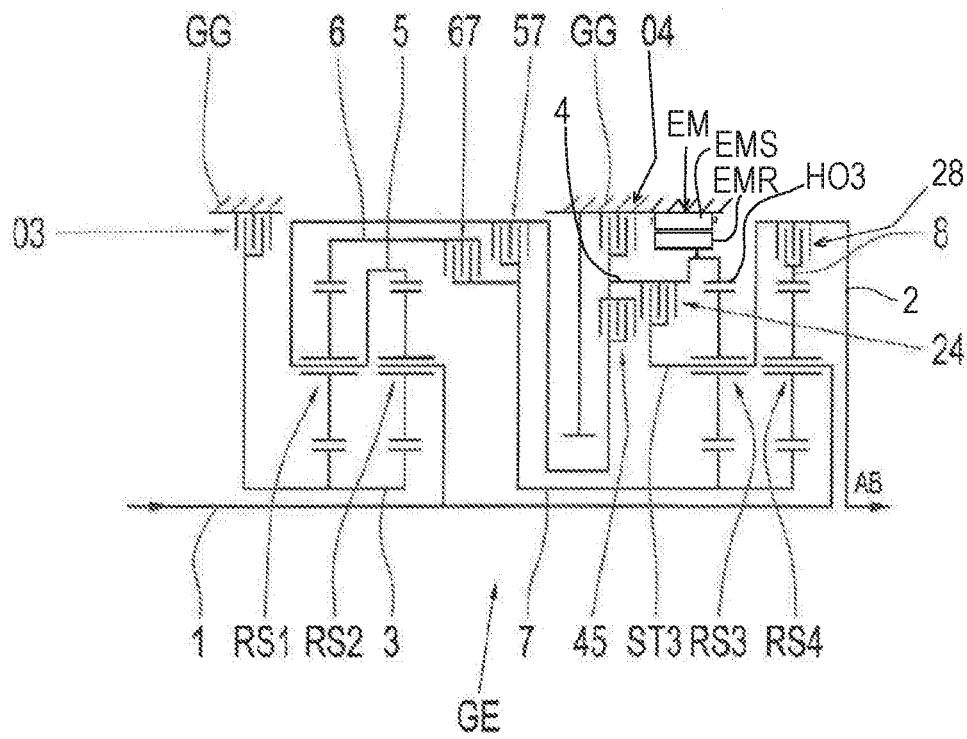
Figure 4A:
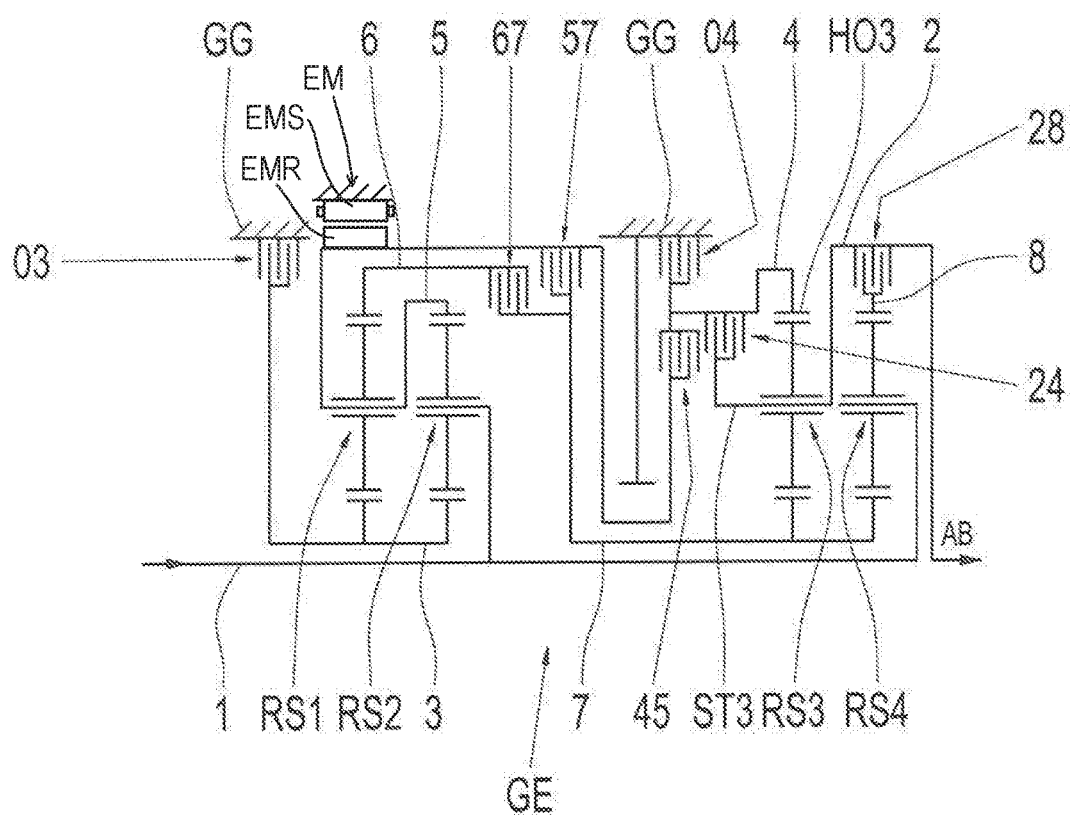

FIG. 4A shows the transmission diagram of a third design example of an automatic transmission according to the invention in an exemplary drive train, particularly of a motor vehicle. With respect to its kinematics, this third design example differs from the second design example shown in FIG. 3A of an automatic transmission according to the invention only in the manner in which the situative interlocking of the third planetary gear set RS3 is realized. In contrast to FIG. 3A, a seventh shift element, labeled with 24 and disposed in the power flow between the fourth rotatable shaft 4 and the second rotatable shaft 2, is now provided for interlocking the third planetary gear set RS3. In the engaged state, this seventh shift element 24, a clutch, thus now connects the ring gear HO3 and the planetary gear carrier ST3 of the third planetary gear set RS3 to one another.

It can easily be seen that the spatial arrangement of the four planetary gear sets and the seven shifting elements depicted in FIG. 4A has been carried over from FIG. 3A.

As in the design example depicted in FIG. 3A and as verified by the shift logic shown in FIG. 4B, the shifting of eleven forward gears and one reverse gear are realizable with the total of seven shift elements 03, 04, 28, 45, 57, 67, 24. In principle, the shift pattern shown in FIG. 4B differs from the shift pattern shown in FIG. 3B only in the modified reference numeral for the seventh shift element. Consequently, unchanged, in the first forward gear the shift elements 04, 57 and 67 are torque transmitting or engaged; in the second forward gear the shift elements 03, 04 and 57, in the third forward gear the shift elements 03, 04 and 67, in the fourth forward gear the shift elements 03, 04 and 28, in the fifth forward gear the shift elements 03, 28 and 67, in the sixth forward gear the shift elements 03, 28 and 57, in the seventh forward gear the shift elements 28, 45 and 57, in the eighth forward gear the shift elements 03, 28 and 45, in the ninth forward gear the shift elements 03, 45 and 57, and in the tenth forward gear the shift elements 03, 45 and 67 are torque transmitting or engaged. In the eleventh forward gear, the shift elements 03, 67 and 24 are torque transmitting. In the reverse gear, the shift elements 04, 45 and 67 are torque transmitting.

The spatial arrangement of the four planetary gear sets RS1, RS2, RS3, RS4 and the seven shift elements 03, 04, 28, 45, 57, 67, 24 of the transmission GE within the transmission housing GG is again widely variable and is limited only by the dimensions and the external shape of the transmission housing GG. Correspondingly, the component arrangement shown in FIG. 4A is expressly to be understood as only one of numerous possible component arrangement options. In the same way, the design of the shift elements shown in FIG. 4A as multi-disc clutches or multi-disc brakes is expressly to be understood as only being an example. In other embodiments, dog or cone clutches, which are shiftable in a positive-locking manner, band brakes which are shiftable in a friction-locking manner, or even dog or cone brakes, which are shiftable in a positive-locking manner, for example, are usable as well. Both the seventh shift element 24 and the second shift element 04 are thus well-suited for a design as positive-locking shift elements.

The design examples shown in FIGS. 4AA-4AC additionally include an electric drive. An electric motor EM is provided for this purpose. The stator EMS of the electric motor EM is mounted on the transmission housing GG, while the rotor EMR of the electric motor EM is connected to the second rotatable shaft 2 of the transmission GE in FIG. 4AA, to the fourth rotatable shaft 4 of the transmission GE in FIG. 4AB, and to the fifth rotatable shaft 5 of the transmission GE in FIG. 4AC.

Figure 5A:
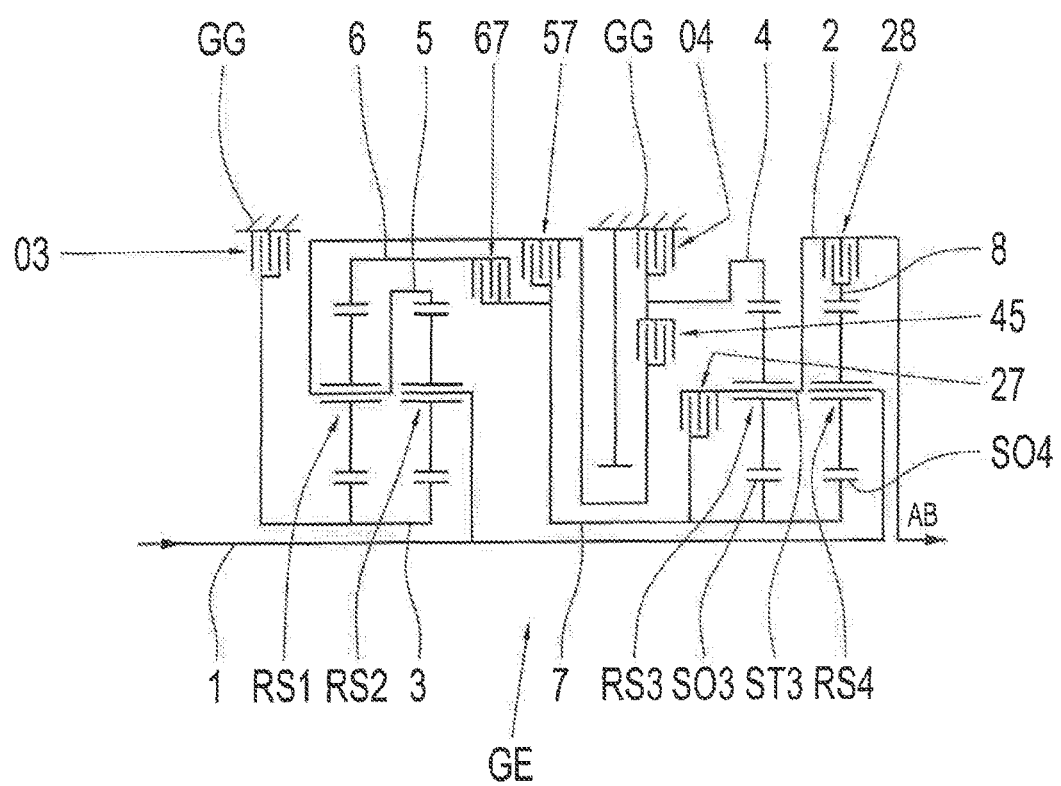
FIG. 5A shows a schematic illustration of a fourth design example of an automatic transmission according to the invention.

FIG. 5A shows the transmission diagram of a fourth design example of an automatic transmission according to the invention in an exemplary drive train, particularly of a motor vehicle. With respect to its kinematics, this fourth design example differs from the design examples of an automatic transmission according to the invention shown in FIG. 3A and FIG. 4A only in the manner in which the situative interlocking of the third planetary gear set RS3 is realized. In contrast to FIG. 3A and FIG. 4A, a seventh shift element, labeled with 27 and disposed in the power flow between the seventh rotatable shaft 7 and the second rotatable shaft 2, is now provided for interlocking the third planetary gear set RS3. In the engaged state, this seventh shift element 27, a clutch, thus now connects the sun gear SO3 and the planetary gear carrier ST3 of the third planetary gear set RS3 to one another.

It can easily be seen that the spatial arrangement of the four planetary gear sets and the seven shift elements depicted in FIG. 5A has substantially been carried over from FIG. 4A, whereby the discrepancies result directly from the different connection of the seventh shift element. In accordance with its coupling now to the planetary gear carrier ST3 of the third planetary gear set RS3, the seventh shift element 27, which is a multi-disc clutch, is no longer a component of the assembly with the second and the fourth shift elements 04, 45; both of which remain coupled to the ring gear HO3 of the third planetary gear set RS3. The clutch 27 is now disposed axially adjacent to the planetary gear carrier ST3 of the third planetary gear set RS3, for example on the side of the third planetary gear set RS3 facing away from the fourth planetary gear set RS4; i.e. still in an area axially between the second and the third planetary gear sets RS2, RS3.

In an alternative embodiment, the seventh shift element 27 can also be disposed on the side of the third planetary gear set RS3 facing toward the fourth planetary gear set RS4; i.e. in an area axially between the third and the fourth planetary gear sets RS3, RS4.

As in the design examples depicted in FIG. 3A and FIG. 4A and as verified by the shift logic shown in FIG. 5B, the shifting of eleven forward gears and one reverse gear are realizable with the total of seven shift elements 03, 04, 28, 45, 57, 67, 27. In principle, the shift pattern shown in FIG. 5B differs from the shift patterns shown in FIG. 3B and in FIG. 4B only in the modified reference numeral for the seventh shift element. Consequently, unchanged, in the first forward gear the shift elements 04, 57 and 67 are torque transmitting or engaged; in the second forward gear the shift elements 03, 04 and 57, in the third forward gear the shift elements 03, 04 and 67, in the fourth forward gear the shift elements 03, 04 and 28, in the fifth forward gear the shift elements 03, 28 and 67, in the sixth forward gear the shift elements 03, 28 and 57, in the seventh forward gear the shift elements 28, 45 and 57, in the eighth forward gear the shift elements 03, 28 and 45, in the ninth forward gear the shift elements 03, 28 and 45, and in the tenth forward gear the shift elements 03, 45 and 67 are torque transmitting or engaged. In the eleventh forward gear, the shift elements 03, 67 and 27 are torque transmitting. In the reverse gear, the shift elements 04, 46 and 67 are torque transmitting.

The spatial arrangement of the four planetary gear sets RS1, RS2, RS3, RS4 and the seven shift elements 03, 04, 28, 45, 57, 67, 27 of the transmission GE within the transmission housing GG is again widely variable and is limited only by the dimensions and the external shape of the transmission housing GG. Correspondingly, the component arrangement shown in FIG. 5A is expressly to be understood as only one of numerous possible component arrangement options. In the same way, the design of the shift elements shown in FIG. 5A as multi-disc clutches or multi-disc brakes is expressly to be understood as only being an example. In other embodiments, dog or cone clutches, which are shiftable in a positive-locking manner, band brakes which are shiftable in a friction-locking manner, or even dog or cone brakes, which are shiftable in a positive-locking manner, for example, are usable as well. The seventh shift element 27 and the second shift element 04 are thus well-suited for a design as positive-locking shift elements.

Figure 6A:
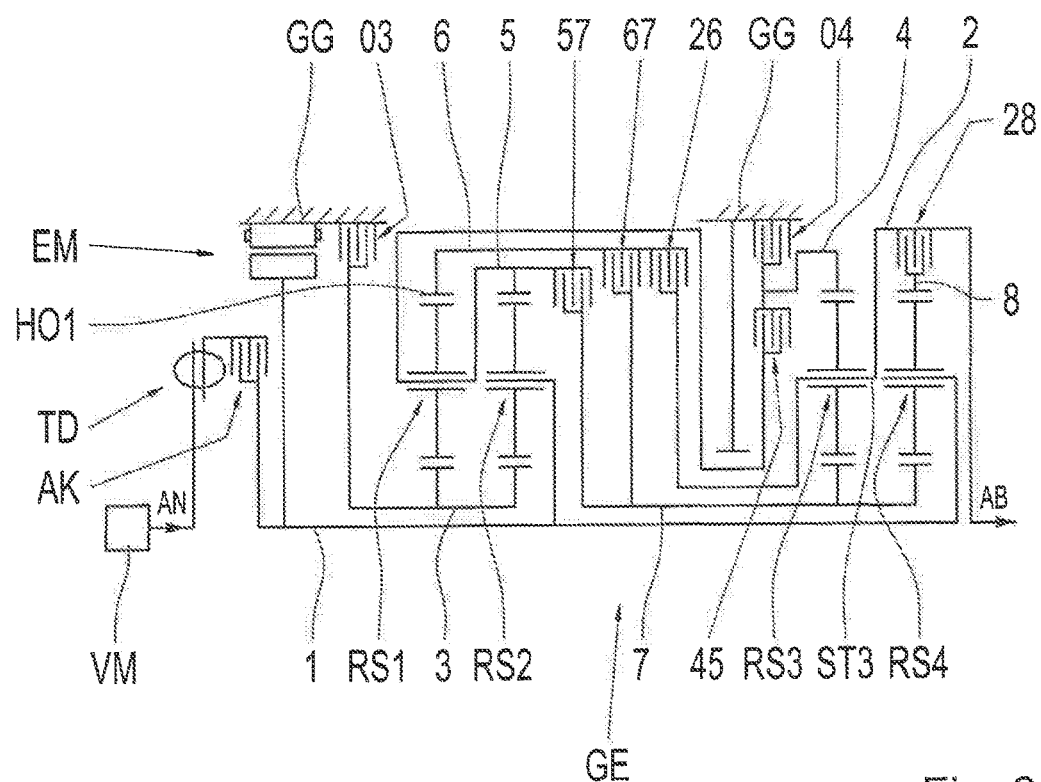
FIG. 6A shows a schematic illustration of a fifth design example of an automatic transmission according to the invention.

FIG. 6A shows the transmission diagram of a fifth design example of an automatic transmission according to the invention in an exemplary drive train, in particular of a motor vehicle. With respect to its kinematics, this fifth design example differs from the first design example of an automatic transmission according to the invention shown in FIG. 2A in that the inventively additional seventh shift element is now disposed in the power flow between the sixth rotatable shaft 6 and the second rotatable shaft 2. In contrast to the first design example depicted in FIG. 2A, via the seventh shift element, the ring gear HO1 of the first planetary gear set RS1 can no longer be connected to the ring gear HO3 of the third planetary gear set RS3, but is instead connectable to the planetary gear carrier ST3 of the third planetary gear set RS3 (and thus with the transmission output). The seventh shift element in FIG. 6A is therefore labeled as 26.

It can easily be seen that the spatial arrangement of the four planetary gear sets and the seven shifting elements depicted in FIG. 6A has been carried over from FIG. 2A, whereby the only difference results directly from the different connection of the seventh shift element, now to the planetary gear carrier of the third planetary gear set.

With the total of seven shift elements 03, 04, 28, 45, 57, 67, 26, a selective shifting of twelve forward gears and one reverse gear are realizable, which will be explained in more detail in the following with the aid of FIG. 6B. FIG. 6B shows an example of a shift pattern for the automatic transmission depicted in FIG. 6A. As indicated with X in the columns of FIG. 6B, which are allocated to the individual shift elements 03, 04, 28, 45, 57, 67, 26, three of the seven shift elements are engaged in each gear. In the first forward gear the shift elements 04, 57 and 26 are torque transmitting or engaged; in the second forward gear the shift elements 04, 57 and 67, in the third forward gear the shift elements 03, 04 and 57, in the fourth forward gear the shift elements 03, 04 and 67, in the fifth forward gear the shift elements 03, 04 and 28, in the sixth forward gear the shift elements 03, 28 and 67, in the seventh forward gear the shift elements 03, 28 and 57, in the eighth forward gear the shift elements 28, 45 and 57, in the ninth forward gear the shift elements 03, 28 and 45, in the tenth forward gear the shift elements 03, 45 and 57, in the eleventh forward gear the shift elements 03, 45 and 67, in the twelfth forward gear the shift elements 03, 67 and 26, and in the reverse gear the shift elements 04, 45 and 67 are torque transmitting or engaged.

The spatial arrangement of the four planetary gear sets RS1, RS2, RS3, RS4 and the seven shift elements 03, 04, 28, 45, 57, 67, 26 of the transmission GE within the transmission housing GG is again widely variable and is limited only by the dimensions and the external shape of the transmission housing GG. Correspondingly, the component arrangement shown in FIG. 6A is expressly to be understood as only one of numerous possible component arrangement options. In the same way, the design of the shift elements shown in FIG. 6A as multi-disc clutches or multi-disc brakes is expressly to be understood as only being an example. In other embodiments, dog or cone clutches, which are shiftable in a positive-locking manner, band brakes which are shiftable in a friction-locking manner, or even dog or cone brakes, which are shiftable in a positive-locking manner, for example, are usable as well. The seventh shift element 26 and the second shift element 04 are thus well-suited for a design as positive-locking shift elements.

Figure 7A:
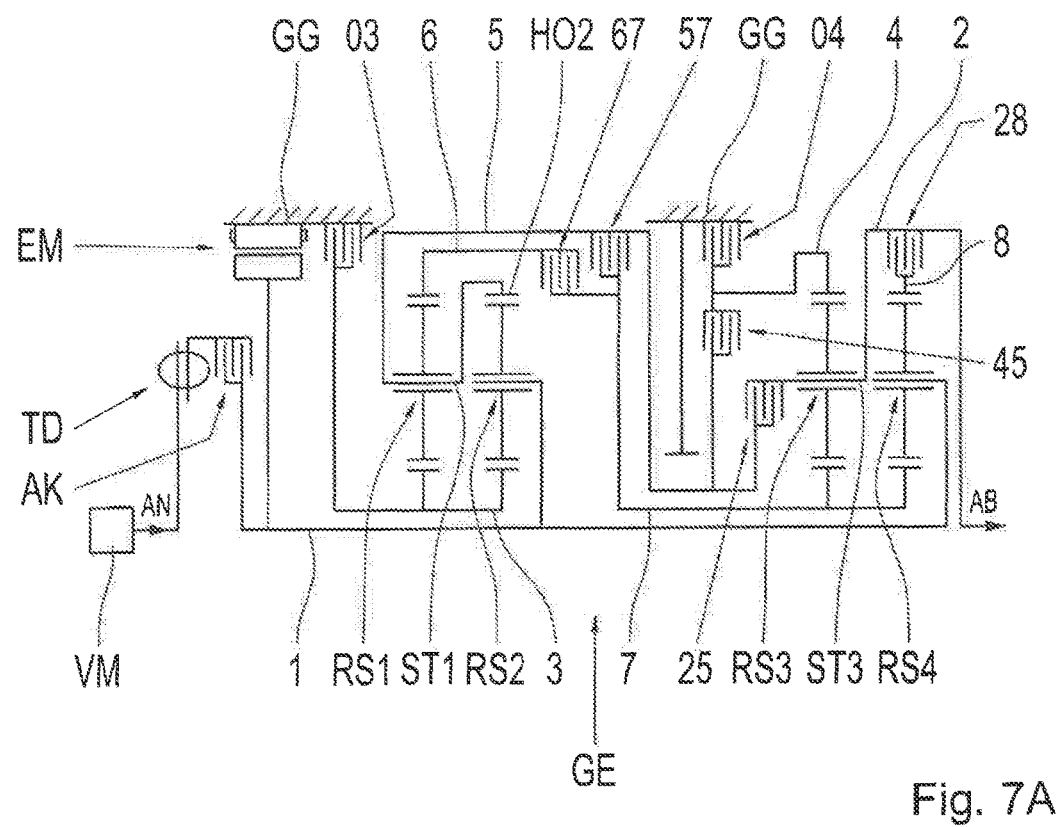
FIG. 7A shows a schematic illustration of a sixth design example of an automatic transmission according to the invention.

FIG. 7A shows the transmission diagram of a sixth design example of an automatic transmission according to the invention in an exemplary drive train, particularly of a motor vehicle. With respect to its kinematics, this sixth design example differs from the fourth design example of an automatic transmission according to the invention shown in FIG. 5A in that the inventively additional seventh shift element is now disposed in the power flow between the fifth rotatable shaft 5 and the second rotatable shaft 2. In contrast to the first design example depicted in FIG. 5A, via the seventh shift element, the planetary gear carrier ST3 of the third planetary gear set RS3 is no longer connectable to the sun gears SO3, SO4 of the third and fourth planetary gear set RS3, RS4, which are connected to one another, but is instead connectable to the planetary gear carrier of the first planetary gear set RS1, which in turn is permanently connected to the ring gear HO2 of the second planetary gear set RS2. The seventh shift element in FIG. 7A is therefore labeled as 25. The seventh shift element 25 is therefore not used to interlock the third planetary gear set RS3, but is instead used for situationally driving the second element of the third planetary gear set RS3 with a different output speed of the upstream gear set.

It can easily be seen that the spatial arrangement of the four planetary gear sets and the seven shifting elements depicted in FIG. 7A has substantially been carried over from FIG. 5A, whereby the differences result directly from the different connection of the seventh shift element, now to the fifth rotatable shaft 5. As an example, FIG. 7A provides that the second shift element 04, which is a multi-disc brake, the fourth shift element 45, which is a multi-disc clutch, and the seventh shift element 25, which is a multi-disc clutch, form a clutch assembly that can be pre-assembled in a manner advantageous in terms of production engineering and includes a first common disc carrier, which is an inner disc carrier for the brake 04 and an external disc carrier for the clutch 45, and a second common disc carrier, which is an inner disc carrier for the clutch 45 and an inner disc carrier for the clutch 25. In doing so, the first common disc carrier is permanently connected to the ring gear HO3 of the third planetary gear set RS3 or, together with said ring gear HO3, is a one-piece component. The external disc carrier of the brake 04 can be integrated into the transmission housing GG in a known manner. In FIG. 7A, viewed in axial direction, the disc pack of brake 04 is disposed substantially radially above the disc pack of clutch 45, while the disc pack of clutch 25 is disposed axially adjacent to the planetary gear carrier ST3 of the third planetary gear set, RS3.

Alternatively, viewed in axial direction, the brake 04 is also disposable radially above the third planetary gear set RS3, whereby then, viewed in axial direction, the disc pack of clutch 45 is disposed adjacent to the disc pack of brake 04.

With the total of seven shift elements 03, 04, 28, 46, 57, 67, 25, and as verified by the shift logic shown in FIG. 7B, the shifting of ten forward gears without grouped shifting and also the realization of a reverse gear without grouped shifting is possible. As indicated with X in the columns of FIG. 7B, which are allocated to the individual shift elements 03, 04, 28, 45, 57, 67, 25, three of the seven shift elements are engaged in each gear. Therefore, in the first forward gear the shift elements 04, 57 and 67 are torque transmitting or engaged; in the second forward gear the shift elements 03, 04 and 57, in the third forward gear the shift elements 03, 04 and 67, in the fourth forward gear the shift elements 03, 04 and 28, in the fifth forward gear the shift elements 03, 28 and 67, in the sixth forward gear the shift elements 03, 28 and 57, in the seventh forward gear the shift elements 28, 46 and 57, in the eighth forward gear the shift elements 03, 28 and 45, in the ninth forward gear the shift elements 03, 45 and 57, and in the tenth forward gear the shift elements 03, 45 and 67 are torque transmitting or engaged. In the first reverse gear the shift elements 04, 46 and 57 are torque transmitting, whereas in the second reverse gear, in which the seventh shift element 25 participates in gear generation, the shift elements 04, 67 and 25 are torque transmitting.

The spatial arrangement of the four planetary gear sets RS1, RS2, RS3, RS4 and the seven shift elements 03, 04, 28, 45, 57, 67, 25 of the transmission GE within the transmission housing GG is again widely variable and is limited only by the dimensions and the external shape of the transmission housing GG. Correspondingly, the component arrangement shown in FIG. 7A is expressly to be understood as only one of numerous possible component arrangement options. In the same way, the design of the shift elements shown in FIG. 7A as multi-disc clutches or multi-disc brakes is expressly to be understood as only being an example. In other embodiments, dog or cone clutches, which are shiftable in a positive-locking manner, band brakes which are shiftable in a friction-locking manner, or even dog or cone brakes, which are shiftable in a positive-locking manner, for example, are usable as well. The seventh shift element 25 and the second shift element 04 are thus well-suited for a design as positive-locking shift elements.

REFERENCE NUMERALS

AB output shaft
AN input shaft
AK launching clutch
EM electric motor
EMR rotor of the electric motor
EMS stator of the electric motor
TD torsion damper
VM internal combustion engine
GE transmission; automatic transmission
GG transmission housing
RS1 first planetary gear set of the transmission
HO1 ring gear of the first planetary gear set
PL1 planetary gears of the first planetary gear set
SO1 sun gear of the first planetary gear set
ST1 planetary gear carrier of the first planetary gear set
RS2 second planetary gear set of the transmission
HO2 ring gear of the second planetary gear set
PL2a outer planetary gears of the second planetary gear set
PL2i inner planetary gears of the second planetary gear set
SO2 sun gear of the second planetary gear set
ST2 planetary gear carrier of the second planetary gear set
RS3 third planetary gear set of the transmission
HO3 ring gear of the third planetary gear set
SO3 sun gear of the third planetary gear set
ST3 planetary gear carrier of the third planetary gear set
RS4 fourth planetary gear set of the transmission
SO4 sun gear of the fourth planetary gear set
ST4 planetary gear carrier of the fourth planetary gear set
HO4 ring gear of the fourth planetary gear set
1 first rotatable shaft of the transmission; transmission input shaft
2 second rotatable shaft of the transmission; transmission output shaft
3 third rotatable shaft of the transmission
4 fourth rotatable shaft of the transmission
5 fifth rotatable shaft of the transmission
6 sixth rotatable shaft of the transmission
7 seventh rotatable shaft of the transmission
8 eighth rotatable shaft of the transmission
03 first shift element of the transmission; first brake
04 second shift element of the transmission; second brake
28 third shift element of the transmission; first clutch
45 fourth shift element of the transmission; second clutch
57 fifth shift element of the transmission; third clutch
67 sixth shift element of the transmission; fourth clutch
46, 47; 27, 24, 26, 25 seventh shift element of the transmission; fifth clutch

The invention claimed is:

1. An automatic transmission (GE) for a motor vehicle, comprising:
 a transmission housing (GG);
 a drivable first rotatable shaft (1);
 a second rotatable shaft (2) as the output of the automatic transmission (GE);
 a plurality of planetary gear sets including a first planetary gear set (RS1), a second planetary gear set (RS2), a third planetary gear set (RS3), and a fourth planetary gear set (RS4); and
 a plurality of shift elements including a first shift element (03), a second shift element (04), a third shift element (28), a fourth shift element (4546), a fifth shift element (57), and a sixth shift element (67) for shifting into different gear ratios between the first shaft (1) and the second shaft (2);
 wherein
 each of the first, second, third and fourth planetary gear sets (RS1, RS2, RS3, RS4) comprises a first element, a second element and a third element configured as a sun gear, a planetary gear carrier, and a ring gear;
 the second element (ST2) of the second planetary gear set (RS2) forms the first rotatable shaft (1) of the automatic transmission (GE);
 the second element (ST3) of the third planetary gear set (RS3) forms the second rotatable shaft (2) of the automatic transmission (GE);
 the first element (SO1) of the first planetary gear set (RS1) and the first element of the second planetary gear set (RS2) are permanently connected to one another and form a third rotatable shaft (3) of the automatic transmission (GE);
 the third element (HO3) of the third planetary gear set (RS3) forms a fourth rotatable shaft (4) of the automatic transmission (GE);
 the second element (ST1) of the first planetary gear set (RS1) and the third element (HO2) of the second planetary gear set (RS2) are permanently connected to one another and form a fifth rotatable shaft (5) of the automatic transmission (GE);
 the third element (HO1) of the first planetary gear set (RS1) forms a sixth rotatable shaft (6) of the automatic transmission (GE);
 the first element (SO3) of the third planetary gear set (RS3) and the first element (SO4) of the fourth planetary gear set (RS4) are permanently connected to one another and form a seventh rotatable shaft (7) of the automatic transmission (GE);
 the third element (HO4) of the fourth planetary gear set (RS4) forms an eighth rotatable shaft (8) of the automatic transmission (GE);
 the first shift element (03) is disposed in the power flow between the third rotatable shaft (3) and the transmission housing (GG);
 the second shift element (04) is disposed in the power flow between the fourth rotatable shaft (4) and the transmission housing (GG);
 the third shift element (28) is disposed in the power flow between the second and the eighth rotatable shafts (2, 8);

the fourth shift element (45) is disposed in the power flow between the fourth and the fifth rotatable shafts (4, 5);

the fifth shift element (57) is disposed in the power flow between the fifth and the seventh rotatable shafts (5, 7);

the sixth shift element (67) is disposed in the power flow between the sixth and the seventh rotatable shafts (6, 7); and a seventh shift element (46; 47; 24; 25; 26; 27) is permanently connected to one of the elements of the third planetary gear set (RS3).

2. The automatic transmission according to claim 1, wherein the seventh shift element (46) is disposed in the power flow between the fourth and the sixth rotatable shafts (4, 6).

3. The automatic transmission according to claim 2, wherein thirteen forward gears and one reverse gear are shiftable in the automatic transmission (GE), such that:
the second, fifth and seventh shift elements (04, 57, 46) are torque transmitting in a first forward gear;
the second, fifth and sixth shift elements (04, 57, 67) are torque transmitting in a second forward gear;
the first, second, and fifth shift elements (03, 04, 57) are torque transmitting in a third forward gear;
the first, second and sixth shift elements (03, 04, 67) are torque transmitting in a fourth forward gear;
the first, second, and third shift elements (03, 04, 28) are torque transmitting in a fifth forward gear;
the first, third, and sixth shift elements (03, 28, 67) are torque transmitting in a sixth forward gear;
the first, third, and fifth shift elements (03, 28, 57) are torque transmitting in a seventh forward gear;
the third, fourth and fifth shift elements (28, 45, 57) are torque transmitting in an eighth forward gear;
the first, third and fourth shift elements (03, 28, 45) are torque transmitting in a ninth forward gear;
the first, fourth and fifth shift elements (03, 45, 57) are torque transmitting in a tenth forward gear;
the first, fourth and sixth shift elements (03, 45, 67) are torque transmitting in an eleventh forward gear;
the first, fifth and seventh shift elements (03, 57, 46) are torque transmitting in a twelfth forward gear;
the first, sixth and seventh shift elements (03, 67, 46) are torque transmitting in a thirteenth forward gear; and
the second, fourth and sixth shift elements (04, 45, 67) are torque transmitting in the reverse gear.

4. The automatic transmission according to claim 1, wherein the seventh shift element (47) is disposed in the power flow between the fourth and the seventh rotatable shafts (4, 7).

5. The automatic transmission according to claim 4, wherein eleven forward gears and one reverse gear are shiftable in the automatic transmission (GE), such that:
the second, fifth and sixth shift elements (04, 57, 67) are torque transmitting in a first forward gear;
the first, second and fifth shift elements (03, 04, 57) are torque transmitting in a second forward gear;
the first, second, and sixth shift elements (03, 04, 67) are torque transmitting in a third forward gear;
the first, second, and third shift elements (03, 04, 28) are torque transmitting in a fourth forward gear;
the first, third, and sixth shift elements (03, 28, 67) are torque transmitting in a fifth forward gear;
the first, third, and fifth shift elements (03, 28, 57) are torque transmitting in a sixth forward gear;
the third, fourth and fifth shift elements (28, 45, 57) are torque transmitting in a seventh forward gear;
the first, third and fourth shift elements (03, 28, 45) are torque transmitting in an eighth forward gear;
the first, fourth and fifth shift elements (03, 45, 57) are torque transmitting in a ninth forward gear;
the first, fourth and sixth shift elements (03, 45, 67) are torque transmitting in a tenth forward gear;
the first, sixth and seventh shift elements (03, 67, 47) are torque transmitting in an eleventh forward gear; and
the second, fourth and sixth shift elements (04, 45, 67) are torque transmitting in the reverse gear.

6. The automatic transmission according to claim 1, wherein the seventh shift element (24; 27) is disposed in the power flow either between the second and the fourth shafts (2, 4) or between the second and the seventh rotatable shafts (2, 7).

7. The automatic transmission according to claim 6, wherein eleven forward gears and one reverse gear are shiftable in the automatic transmission (GE), such that:
the second, fifth and sixth shift elements (04, 57, 67) are torque transmitting in a first forward gear;
the first, second and fifth shift elements (03, 04, 57) are torque transmitting in a second forward gear;
the first, second, and sixth shift elements (03, 04, 67) are torque transmitting in a third forward gear;
the first, second, and third shift elements (03, 04, 28) are torque transmitting in a fourth forward gear;
the first, third, and sixth shift elements (03, 28, 67) are torque transmitting in a fifth forward gear;
the first, third, and fifth shift elements (03, 28, 57) are torque transmitting in a sixth forward gear;
the third, fourth and fifth shift elements (28, 45, 57) are torque transmitting in a seventh forward gear;
the first, third and fourth shift elements (03, 28, 45) are torque transmitting in an eighth forward gear;
the first, fourth and fifth shift elements (03, 45, 57) are torque transmitting in a ninth forward gear;
the first, fourth and sixth shift elements (03, 45, 67) are torque transmitting in a tenth forward gear;
the first, sixth and seventh shift elements (03, 67, 24; 03, 67, 27) are torque transmitting in an eleventh forward gear; and
the second, fourth and sixth shift elements (04, 45, 67) are torque transmitting in the reverse gear.

8. The automatic transmission according to claim 1, wherein the seventh shift element (26) is disposed in the power flow between the second and the sixth rotatable shafts (2, 6).

9. The automatic transmission according to claim 8, wherein twelve forward gears and one reverse gear are shiftable in the automatic transmission (GE), such that:
the second, fifth and seventh shift elements (04, 57, 26) are torque transmitting in a first forward gear;
the second, fifth and sixth shift elements (04, 57, 67) are torque transmitting in a second forward gear;
the first, second, and fifth shift elements (03, 04, 57) are torque transmitting in a third forward gear;
the first, second and sixth shift elements (03, 04, 67) are torque transmitting in a fourth forward gear;
the first, second, and third shift elements (03, 04, 28) are torque transmitting in a fifth forward gear;
the first, third, and sixth shift elements (03, 28, 67) are torque transmitting in a sixth forward gear;
the first, third, and fifth shift elements (03, 28, 57) are torque transmitting in a seventh forward gear;

the third, fourth and fifth shift elements (28, 45, 57) are torque transmitting in an eighth forward gear;
the first, third and fourth shift elements (03, 28, 45) are torque transmitting in a ninth forward gear;
the first, fourth and fifth shift elements (03, 45, 57) are torque transmitting in a tenth forward gear;
the first, fourth and sixth shift elements (03, 45, 67) are torque transmitting in an eleventh forward gear;
the first, sixth and seventh shift elements (03, 67, 26) are torque transmitting in a twelfth forward gear; and
the second, fourth and sixth shift elements (04, 45, 67) are torque transmitting in the reverse gear.

10. The automatic transmission according to claim 1, wherein the seventh shift element (25) is disposed in the power flow between the second and the fifth rotatable shafts (2, 5).

11. The automatic transmission according to claim 10, wherein ten forward gears and two reverse gears are shiftable in the automatic transmission (GE), such that:
the second, fifth and sixth shift elements (04, 57, 67) are torque transmitting in a first forward gear;
the first, second and fifth shift elements (03, 04, 57) are torque transmitting in a second forward gear;
the first, second, and sixth shift elements (03, 04, 67) are torque transmitting in a third forward gear;
the first, second, and third shift elements (03, 04, 28) are torque transmitting in a fourth forward gear;
the first, third, and sixth shift elements (03, 28, 67) are torque transmitting in a fifth forward gear;
the first, third, and fifth shift elements (03, 28, 57) are torque transmitting in a sixth forward gear;
the third, fourth and fifth shift elements (28, 45, 57) are torque transmitting in a seventh forward gear;
the first, third and fourth shift elements (03, 28, 45) are torque transmitting in an eighth forward gear;
the first, fourth and fifth shift elements (03, 45, 57) are torque transmitting in a ninth forward gear;
the first, fourth and sixth shift elements (03, 45, 67) are torque transmitting in a tenth forward gear;
the second, fourth and sixth shift elements (04, 45, 67) are torque transmitting in a first reverse gear; and
the second, sixth and seventh shift elements (04, 67, 25) are torque transmitting in a second reverse gear.

12. The automatic transmission according to claim 1, wherein all four planetary gear sets (RS1, RS2, RS3, RS4) are negative planetary gear sets.

13. The automatic transmission according to claim 12, wherein
the first element of each negative planetary gear set is a sun gear;
the second element of each negative planetary gear set is a planetary gear carrier; and
the third element of each negative planetary gear set is a ring gear.

14. The automatic transmission according to claim 1, wherein at least one of the second, third, or fourth planetary gear sets (RS2, RS3, RS4) is a positive planetary gear set.

15. The automatic transmission according to claim 14, wherein
the first element of each positive planetary gear set is a sun gear;
the second element of each positive planetary gear set is a ring gear; and
the third element of each positive planetary gear set is a planetary gear carrier.

16. The automatic transmission according to claim 1, wherein the planetary gear sets are disposed coaxially to one another along an axial direction in a sequence: the first planetary gear set (RS1); the second planetary gear set (RS2); the third planetary gear set (RS3); and the fourth planetary gear set (RS3).

17. The automatic transmission according to claim 1, wherein the seventh shift element (47; 46; 24; 25; 26; 27) is disposed between the second and the third planetary gear sets (RS2, RS3) along an axial direction.

18. The automatic transmission according to claim 17, wherein the fifth, sixth and seventh shift elements (57, 67, 46; 57, 67, 26) form a clutch assembly, the clutch assembly comprising:
a common disc carrier for the fifth and the sixth shift elements (57, 67);
a common disc carrier for the sixth and seventh shift elements (67, 46; 67, 26);
a disc pack with the inner and outer clutch discs of the fifth shift element (57);
an actuation device of the fifth shift element (57) that actuates the disc pack of the fifth shift element (57);
a disc pack with the inner and outer clutch discs of the sixth shift element (67);
an actuation device of the sixth shift element (67) that actuates the disc pack of the sixth shift element (67);
a disc pack with the inner and outer clutch discs of the seventh shift element (46; 26); and
an actuation device of the seventh shift element (46; 26) that actuates the disc pack of the seventh shift element (46; 26).

19. The automatic transmission according to claim 17, wherein the second, fourth and seventh shift elements (04, 45, 47; 04, 45, 24) form a clutch assembly, the clutch assembly comprising:
a common disc carrier for the second, fourth and seventh shift elements (04, 45, 47; 04, 45, 24);
a disc pack with the inner and outer clutch discs of the fourth shift element (45);
an actuation device of the fourth shift element (45) that actuates the disc pack of the fourth shift element (45);
a disc pack with the inner and outer clutch discs of the seventh shift element (47; 24); and
an actuation device of the seventh shift element (47; 24) that actuates the disc pack of the seventh shift element (47; 24).

20. The automatic transmission according to claim 17, wherein the second, fourth and seventh shift elements (04, 45, 25) form a clutch assembly, the clutch assembly comprising:
a common disc carrier for the second and fourth shift elements (04, 45);
a common disc carrier for the fourth and seventh shift elements (45, 25);
a disc pack with the inner and outer clutch discs of the fourth shift element (45);
an actuation device of the fourth shift element (45) that actuates the disc pack of the fourth shift element (45);
a disc pack with the inner and outer clutch discs of the seventh shift element (25); and
an actuation device of the seventh shift element (25) that actuates the disc pack of the seventh shift element (25).

21. The automatic transmission according to claim 1, wherein the seventh shift element (27) is disposed between the third and the fourth planetary gear sets (RS3, RS4) along an axial direction.

22. The automatic transmission according to claim 1, wherein the seventh shift element (47; 24; 25; 27) is disposed adjacent the third planetary gear set (RS3).

23. The automatic transmission according to claim 1, further comprising an electric motor (EM), wherein the first rotatable shaft (1) is permanently connected to a rotor (EMR) of the electric motor (EM).

24. The automatic transmission according to claim 1, further comprising an electric motor (EM), wherein the second rotatable shaft (2) is permanently connected to a rotor (EMR) of the electric motor (EM).

25. The automatic transmission according to claim 1, further comprising an electric motor (EM), wherein the fourth rotatable shaft (4) is permanently connected to a rotor (EMR) of the electric motor (EM).

26. The automatic transmission according to claim 1, further comprising an electric motor (EM), wherein the fifth rotatable shaft (5) is permanently connected to a rotor (EMR) of the electric motor (EM).

* * * * *